(12) United States Patent
Ito et al.

(10) Patent No.: US 8,349,405 B2
(45) Date of Patent: Jan. 8, 2013

(54) LIQUID DISCHARGE METHOD AND LIQUID DISCHARGE DEVICE

(75) Inventors: Takeshi Ito, Nagano (JP); Kazumi Aruga, Fujimi-machi (JP); Satoru Katagami, Nagano (JP); Sadaharu Komori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 593 days.

(21) Appl. No.: 12/543,178

(22) Filed: Aug. 18, 2009

(65) Prior Publication Data

US 2010/0055324 A1 Mar. 4, 2010

(30) Foreign Application Priority Data

Aug. 28, 2008 (JP) .................................. 2008-219267

(51) Int. Cl.
*B41J 2/00* (2006.01)
*B41J 2/01* (2006.01)
*B41J 2/04* (2006.01)
*B41J 2/21* (2006.01)

(52) U.S. Cl. .............. 427/287; 427/58; 427/74; 427/75; 427/108; 427/162; 427/164; 427/165; 427/256; 427/258; 427/261; 347/1; 347/12; 347/20; 347/40; 347/44; 118/300; 118/305; 118/313

(58) Field of Classification Search ........................ None
See application file for complete search history.

(56) References Cited

U.S. PATENT DOCUMENTS

2004/0032480 A1* 2/2004 Kawase et al. ................ 347/106
2006/0292291 A1* 12/2006 White et al. .................... 427/58
2008/0278534 A1* 11/2008 Kim et al. ....................... 347/19

FOREIGN PATENT DOCUMENTS

| JP | 2006-130407 A | 5/2006 |
| JP | 2006-289765 A | 10/2006 |
| JP | 2008-149315 A | 7/2008 |
| JP | 2008-191373 A | 8/2008 |

* cited by examiner

*Primary Examiner* — Nathan Empie
*Assistant Examiner* — Lisha Jiang
(74) *Attorney, Agent, or Firm* — Global IP Counselors, LLP

(57) ABSTRACT

A liquid discharge method is a method for depositing liquid on a plurality of target discharge partitioned areas formed on a substrate as the liquid is selectively discharged from a plurality of discharge nozzles while the substrate and the discharge nozzles are moved relative to each other. The liquid discharge method includes setting an arrangement pattern according to shapes and positions of the target discharge partitioned areas so that a number of the discharge nozzles selected to be used among the discharge nozzles capable of depositing the liquid in the target discharge partitioned areas is the same in each discharge timing.

10 Claims, 17 Drawing Sheets

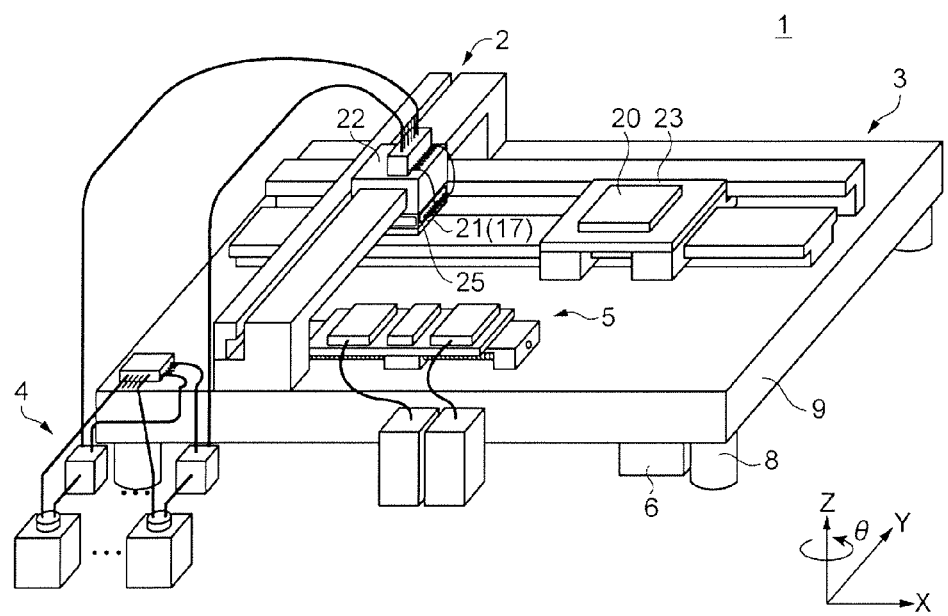
F I G. 1

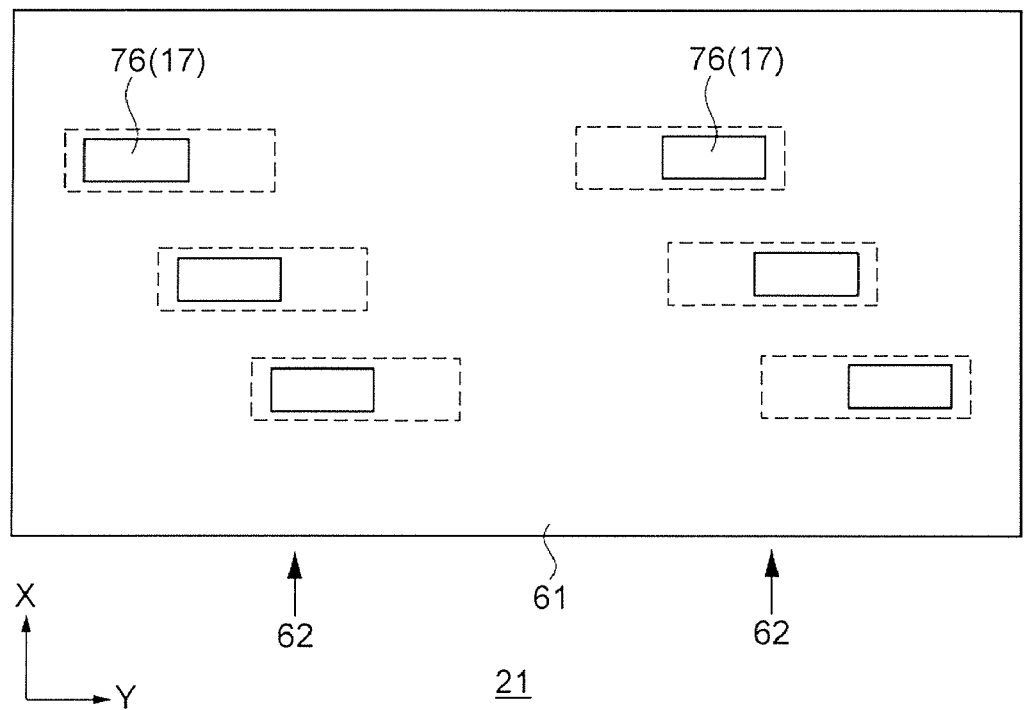
F I G. 3

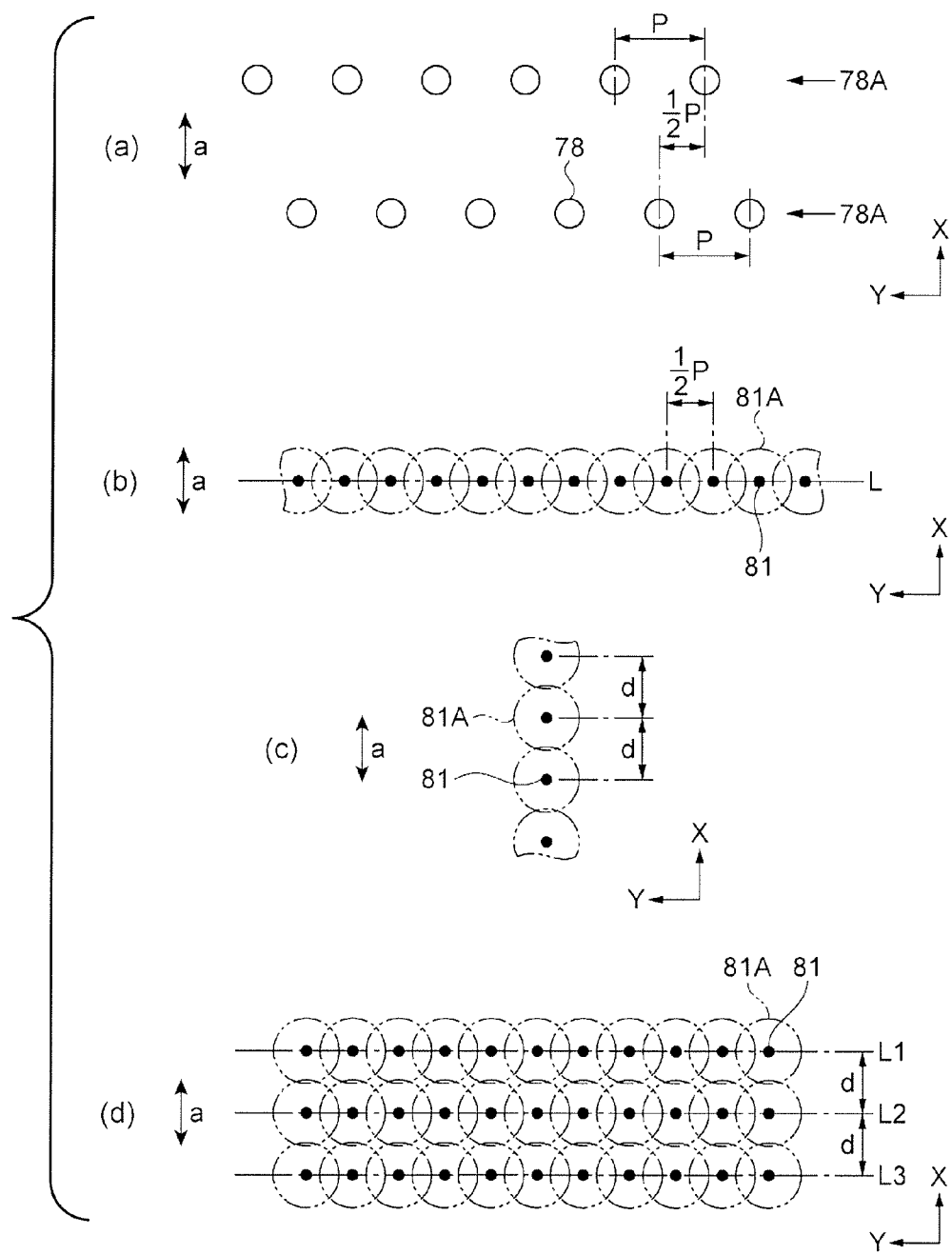
F I G. 7

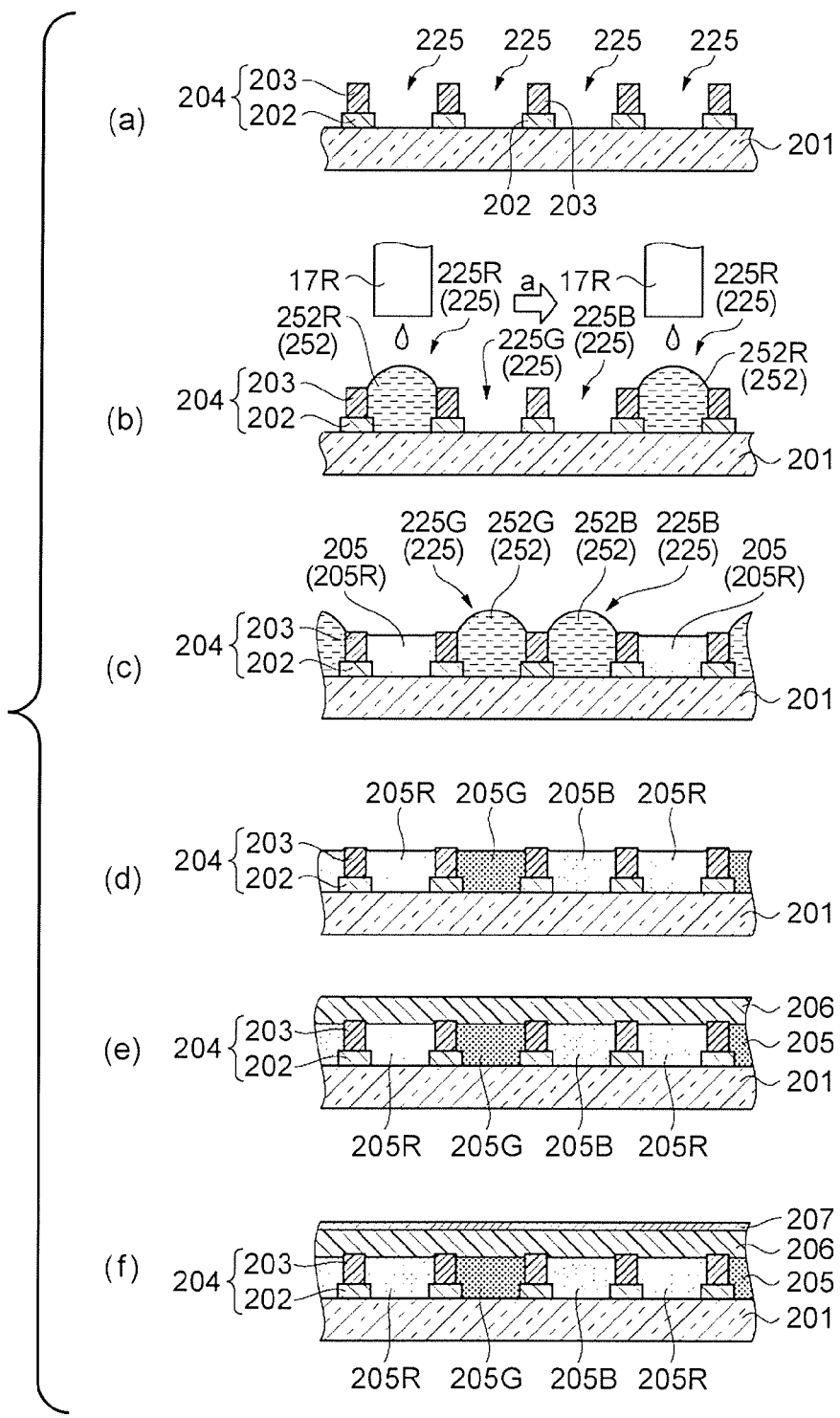
F I G. 12

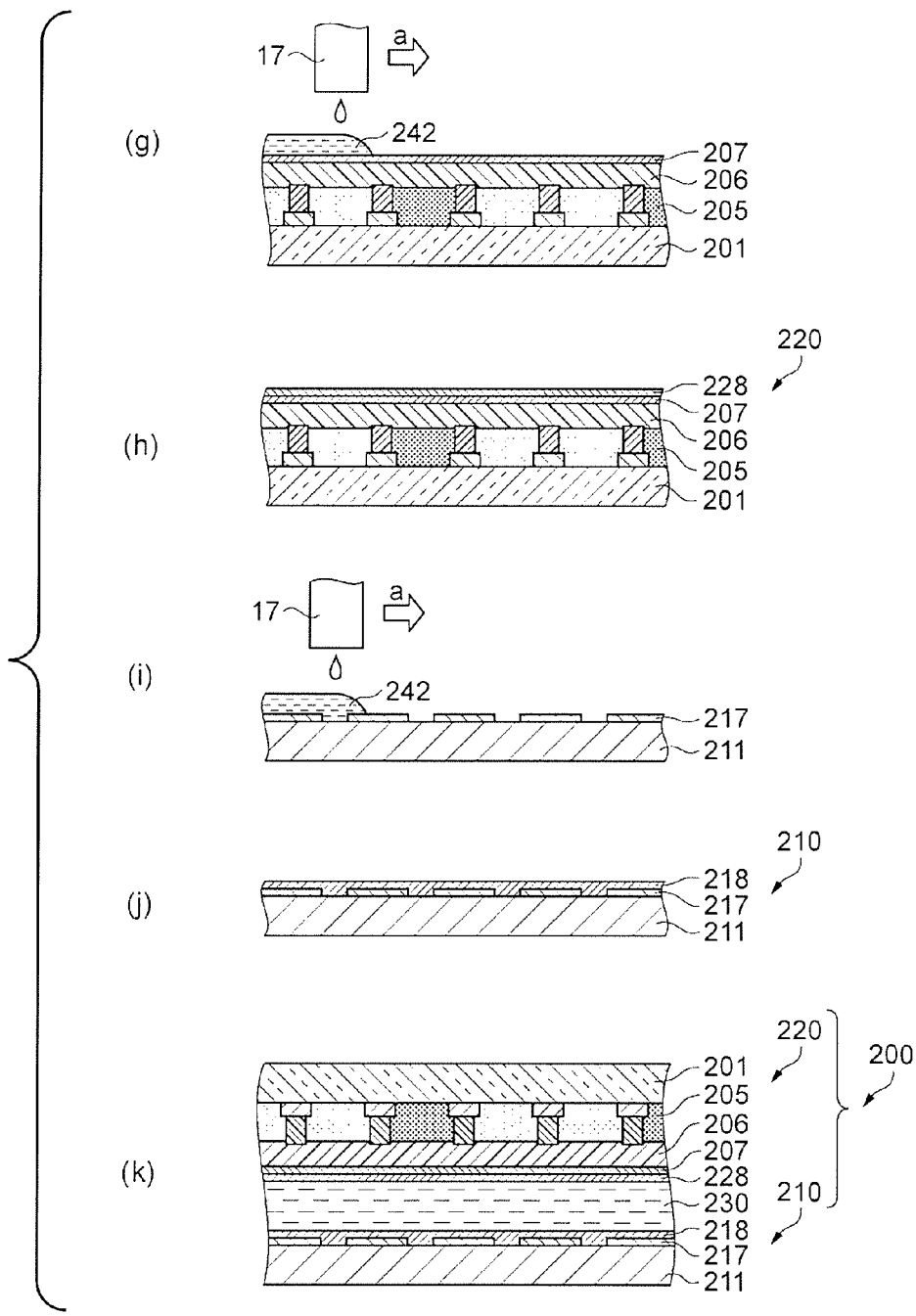
F I G. 13

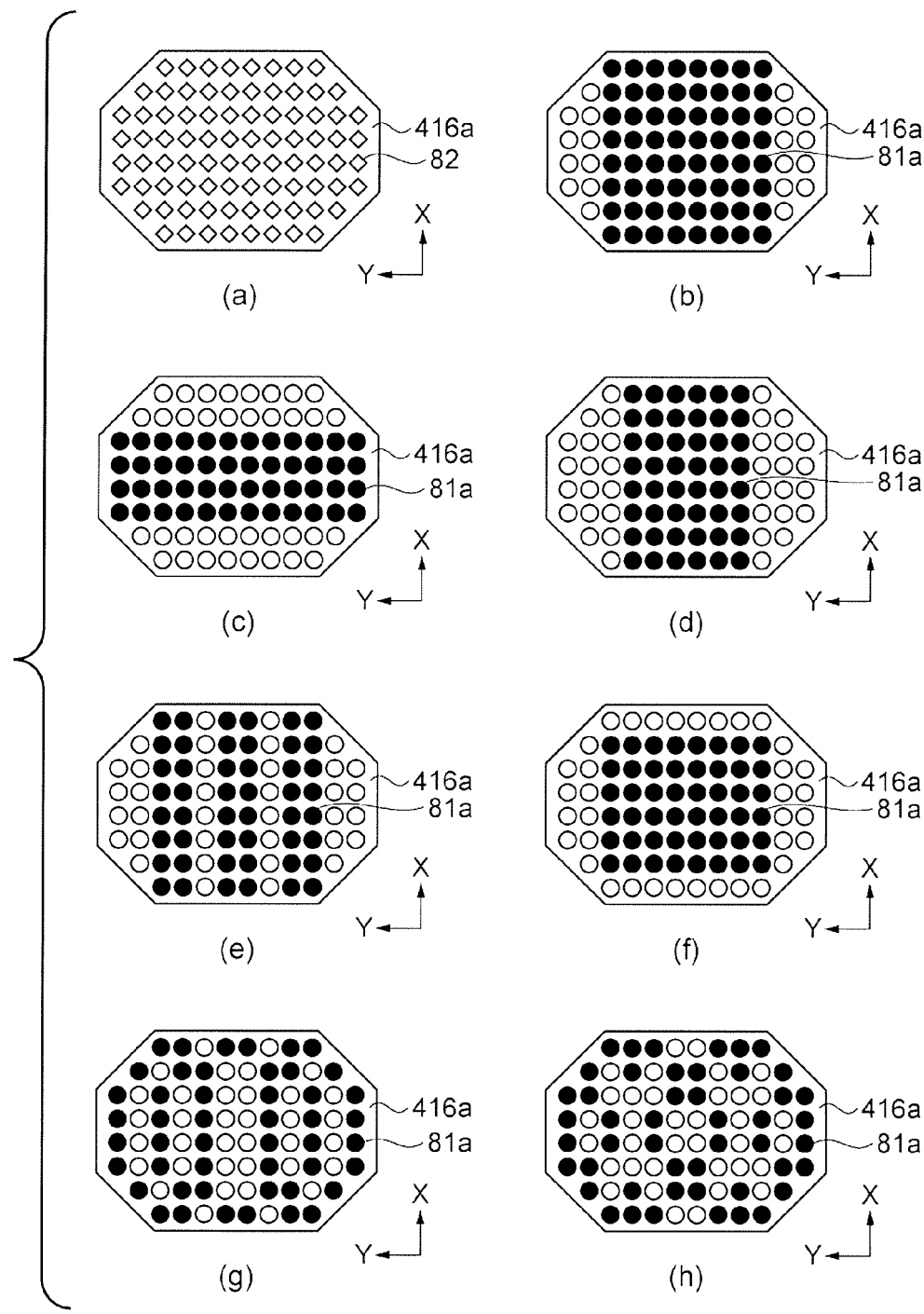
F I G. 17

LIQUID DISCHARGE METHOD AND LIQUID DISCHARGE DEVICE

CROSS-REFERENCE TO RELATED APPLICATIONS

This application claims priority to Japanese Patent Application No. 2008-219267 filed on Aug. 28, 2008. The entire disclosure of Japanese Patent Application No. 2008-219267 is hereby incorporated herein by reference.

BACKGROUND

1. Technical Field

The present invention relates to a liquid discharge method for discharging a liquid using a discharge nozzle for discharging the liquid, and a liquid discharge device having a discharge nozzle for discharging the liquid.

2. Related Art

There are known conventional techniques for forming a color filter film or another functional film of a color liquid crystal device in which droplets of a liquid containing a material of a functional film are discharged and made to land in arbitrary positions on the substrate using a drawing device having a droplet discharge head for discharging liquid as droplets, whereby liquid is deposited (drawn) in the positions and the deposited liquid is dried to form a functional film. A drawing device used for forming such a film is capable of forming a film having a precise planar shape and thickness because very small droplets are selectively discharged from the discharge nozzles of a droplet discharge head and made to land with good positional precision on a substrate while the droplet discharge head is moved in a relative fashion in relation to the substrate.

There is a need to obtain a functional film having greater precision in planar shape and thickness in order to form a higher function functional film. An accurate amount of liquid must be deposited in each of the partitioned areas for forming a functional film in order to obtain a higher precision thickness. The amount of liquid to be discharged from each of the nozzles must be an accurate amount that is in accordance with an established discharge amount in order to deposit an accurate amount of liquid.

However, in a droplet discharge head having numerous nozzles, it is difficult to avoid a situation in which adjacently formed nozzles affect each other, and it is possible that the discharge amount will fluctuate due to peripheral discharge nozzles that are resting or discharging. Japanese Laid-Open Patent Application No. 2006-289765 discloses an inkjet printer that is designed to improve deteriorating print quality that occurs when there is variation in the number of discharges by the nozzle of a print head (droplet discharge head) by correcting drive pulses fed to the drive element of each nozzle of the print head in accordance with the ink discharge rate of the nozzle array of the print head.

SUMMARY

In the device disclosed in Patent Document 1, however, it is required that the discharge rate of the nozzle array be determined, corresponding correction data be acquired, the drive signal to the print head be determined for each discharge nozzle, and the drive pulse correction be implemented. A controller of the droplet discharge device must perform the work for correcting the drive pulses in order to correct the drive pulses. Time is required for performing the correction work, and the load on the controller for performing the correction work increases. It is effective to provide numerous discharge nozzles in order to efficiently carry out drawing discharges, but there is a problem in that each of the numerous nozzles must undergo an operation for correction the numerous drive pulses in order to achieve drive pulse correction, and it is possible that more time will be required for the step for depositing the liquid.

The present invention was contrived in order to solve in least a portion of the problems described above, and can be implement in the following modes and application examples.

A liquid discharge method according to the first aspect of the present invention is a method for depositing liquid on a plurality of target discharge partitioned areas formed on a substrate as the liquid is selectively discharged from a plurality of discharge nozzles while the substrate and the discharge nozzles are moved relative to each other. The liquid discharge method includes setting an arrangement pattern according to shapes and positions of the target discharge partitioned areas so that a number of the discharge nozzles selected to be used among the discharge nozzles capable of depositing the liquid in the target discharge partitioned areas is the same in each discharge timing.

According to this liquid discharge method, the number of discharge nozzles for carrying out a discharge in a discharge timing is set to a predetermined number. Accordingly, the number of discharge nozzles that carry out a discharge at substantially the same time is set to a predetermined number and is constant. Fluctuations caused by a different number of discharge nozzles performing a discharge at substantially the same time can thereby be eliminated and fluctuations in the discharge amount can be reduced.

In the liquid discharge method as described above, the setting of the arrangement pattern preferably includes setting the arrangement pattern so that the number of the discharge nozzles selected to be used in each discharge timing to deposit the liquid in one of the target discharge partitioned areas is set to a predetermined number.

According to this liquid discharge method, the number of discharge nozzles used for discharge in a discharge timing is set to a predetermined number in a single target discharge partitioned area. Accordingly, the number of discharge nozzles for carrying out a discharge at substantially the same time in a single target discharge partitioned area is set to a predetermined number and is constant. Fluctuations caused by a different number of discharge nozzles performing a discharge at substantially the same time can thereby be eliminated and fluctuations in the discharge amount can be reduced.

In the liquid discharge method as described above, the setting of the arrangement pattern preferably includes setting the arrangement pattern so that a number of discharge cycles of each of the discharge nozzles selected to be used to deposit the liquid in one of the target discharge partitioned areas is the same.

According to this liquid discharge method, the number of discharge cycles for the discharge nozzles to deposit the liquid is constant in a single target discharge partitioned area. An orderly operating state is achieved by repeating a non-discharge state in the portion between target discharge partitioned areas and a fixed number of discharge cycles toward the target discharge partitioned areas. The operating state of the discharge nozzles can thereby be kept in a substantially constant state in contrast to the case in which the number of discharge cycles is different for each discharge nozzle. The discharge nozzles are kept in substantially the same operating state because the operating state of a discharge nozzle as such affects the discharge quantity. Therefore, fluctuations in the discharge amount that are attributable to the operating state can be reduced.

In the liquid discharge method as described above, the setting of the arrangement pattern preferably includes setting the arrangement pattern so that a discharge interval of each of the discharge nozzles selected to be used to deposit the liquid in one of the target discharge partitioned areas is equivalent to a minimum value of an interval of the discharge timing.

According to this liquid discharge method, the interval for discharging liquid in a single target discharge partitioned area is a minimum value of the interval of the discharge timing. In other words, the discharge nozzles perform consecutive discharges for carrying out a discharge at each opportunity in which a discharge can be performed. The discharge nozzles can be kept in the same operating state while carrying out consecutive discharges, in contrast to the case in which discharges are carried out with skipped intervals. The discharge nozzles are kept in substantially the same operating state because the operating state of a discharge nozzle as such affects the discharge quantity. Therefore, fluctuations in the discharge amount that are attributable to the operating state can be reduced.

In the liquid discharge method as described above, the setting of the arrangement pattern preferably includes setting the arrangement pattern so that a shape obtained by connecting an outermost periphery of landing positions of the liquid within one of the target discharge partitioned areas has a maximum surface area.

According to this liquid discharge method, the landing positions are set so as obtain a maximum surface area of a polygonal shape connecting the landing positions of the outermost periphery of a predetermined number of landing positions. The region in which the liquid is deposited thereby becomes the maximum area and the size of the region in which the liquid is deposited in the target discharge partitioned area becomes the maximum area. Therefore, deposited liquid can readily wet and spread over the entire surface of the target discharge partitioned area. When the liquid is deposited in the target discharge partitioned area, and the region in which the liquid is to be made to wet and spread is greater in size than the target discharge partitioned area, the liquid can still readily wet and spread over the entire surface of the region.

In the liquid discharge method as described above, the setting of the arrangement pattern preferably includes setting the arrangement pattern so that a shape obtained by connecting an outermost periphery of landing positions of the liquid within one of the target discharge partitioned areas has a minimum surface area.

According to this liquid discharge method, the landing positions are set in a position so as to obtain a minimum surface area of a polygonal shape connecting the landing positions of the outermost periphery of a predetermined number of landing positions. The region in which the liquid is deposited thereby becomes the minimum area and the size of the region in which the liquid is deposited in the target discharge partitioned area becomes the minimum area. Therefore, the distance between the landing position and the partition position of the outer shape of the target discharge partitioned area can be maximized in terms of average distance. The possibility that the liquid will land in a position outside of the target discharge partitioned area can be reduced when the liquid is deposited.

In the liquid discharge method as described above, the setting of the arrangement pattern preferably includes setting the arrangement pattern so that a maximum number of the discharge nozzles is selected to be used to deposit the liquid within one of the target discharge partitioned areas.

According to this liquid discharge method, the number of discharge nozzles to be used for causing liquid to land in a predetermined number of landing positions is maximal. The discharge amount of the discharge nozzles varies within a specified range and is different for each discharge nozzle. The effect that the discharge amount variation of each of the discharge nozzles has on amount of liquid deposited in each of the target discharge partitioned areas can be reduced by using a large number of discharge nozzles. Therefore, it is possible to reduce the variation in the amount of liquid deposited in the target discharge partitioned areas due to variation in the discharge amount of the discharge nozzles.

In the liquid discharge method as described above, the setting of the arrangement pattern preferably includes setting the arrangement pattern so that a minimum number of the discharge nozzles is selected to be used to deposit the liquid within one of the target discharge partitioned areas.

According to this liquid discharge method, the number discharge nozzles to be used for causing liquid to land in a predetermined number of landing positions is minimal. The discharge amount of the discharge nozzles varies within a specified range and is different for each discharge nozzle. Adjustment is carried out using a fixed number of discharge nozzles as a set when the discharge amount of the discharge nozzles is adjusted, and it is therefore very likely that there will be low variability in the discharge amount between discharge nozzles adjusted in the same set. It is also very likely that the difference in discharge amounts will be small because the peripheral conditions are very likely to be substantially the same between discharge nozzles formed in close proximity. The number of discharge nozzles to be used is reduced, whereby it is very likely that the discharge nozzles adjusted as the same set or the discharge nozzles formed in close proximity will be used. Since it is very likely that there will be low variability in the discharge amounts of the discharge nozzles to be used, the variability in the amount of liquid to be deposited in the target discharge partitioned areas can be reduced.

In the liquid discharge method as described above, the setting of the arrangement pattern preferably includes setting the arrangement pattern so that the discharge nozzles arranged adjacent to each other are selected to deposit the liquid within the one of the target discharge partitioned areas.

According to this liquid discharge method, the discharge nozzles to be used for causing liquid to land in a predetermined number of landing positions are the discharge nozzles arranged adjacent to each other. The discharge amount of the discharge nozzles varies within a specified range and is different for each discharge nozzle. Adjustment is carried out using a fixed number of discharge nozzles as a set when the discharge amount of the discharge nozzles is adjusted, and it is therefore very likely that there will be low variability in the discharge amount between discharge nozzles adjusted in the same set. It is also very likely that the difference in discharge amounts is small because the peripheral conditions are very likely to be substantially the same between discharge nozzles formed in close proximity. The discharge nozzles formed in closest proximity are used by setting the discharge nozzles to be used to be the discharge nozzles arranged adjacent to each other. It is also very likely that adjustment will be carried out in the same set. Since it is very likely that there will be low variability in the discharge amounts of the discharge nozzles to be used, the variability in the amount of liquid to be deposited in the target discharge partitioned areas can be reduced.

A liquid discharge device according to the second aspect of the present invention is configured to deposit liquid on a plurality of target discharge partitioned areas formed on a substrate as the liquid is selectively discharged from a plurality of discharge nozzles while the substrate and the discharge nozzles are moved relative to each other by a movement mechanism. The liquid discharge device includes a deposit pattern setting section configured to set an arrangement pattern according to shapes and positions of the target discharge partitioned areas so that a number of the discharge nozzles selected to be used among the discharge nozzles capable of depositing the liquid in the target discharge partitioned areas is the same in each discharge timing.

According to this liquid discharge device, the number of discharge nozzles to be used in each discharge timing is set to a predetermined number. Accordingly, the number of discharge nozzles that carry out a discharge at substantially the same time is set to a predetermined number and is constant. Fluctuations caused by a different number of discharge nozzles performing a discharge at substantially the same time can thereby be eliminated and fluctuations in the discharge amount can be reduced.

In the liquid discharge device as described above, the deposit pattern setting section is preferably configured to set the arrangement pattern so that the number of the discharge nozzles selected to be used in each discharge timing to deposit the liquid in one of the target discharge partitioned areas is set to a predetermined number.

According to this liquid discharge device, the number of discharge nozzles used for discharge per discharge timing is set to a predetermined number in a single target discharge partitioned area. Accordingly, the number of discharge nozzles for carrying out a discharge at substantially the same time is set to a predetermined number and is constant. Fluctuations caused by a different number of discharge nozzles performing a discharge at substantially the same time can thereby be eliminated and fluctuations in the discharge amount can be reduced.

In the liquid discharge device as described above, the deposit pattern setting section is preferably configured to set the arrangement pattern so that a number of discharge cycles of each of the discharge nozzles selected to be used to deposit the liquid in one of the target discharge partitioned areas is the same.

According to this liquid discharge device, the number of discharge cycles for the discharge nozzles to deposit the liquid is constant in a single target discharge partitioned area. An orderly operating state is achieved by repeating a non-discharge state in the portion between target discharge partitioned areas and a fixed number of discharge cycles toward the target discharge partitioned areas. The operating state of the discharge nozzles can thereby be kept in a substantially constant state in contrast to the case in which the number of discharge cycles is different for each discharge nozzle. The discharge nozzles are kept in substantially the same operating state because the operating state of a discharge nozzle as such affects the discharge quantity. Therefore, fluctuations in the discharge amount that are attributable to the operating state can be reduced.

In the liquid discharge device as described above, the deposit pattern setting section is preferably configured to set the arrangement pattern so that a discharge interval of each of the discharge nozzles selected to be used to deposit the liquid in one of the target discharge partitioned areas is equivalent to a minimum value of an interval of the discharge timing.

According to this liquid discharge device, the interval for discharging liquid in a single target discharge partitioned area is a minimum value of the interval of the discharge timing. In other words, the discharge nozzles perform consecutive discharges for carrying out a discharge at each opportunity in which a discharge can be performed. The discharge nozzles can be kept in the same operating state while carrying out consecutive discharges, in contrast with the case in which discharges are carried out with skipped intervals. The discharge nozzles are kept in substantially the same operating state because the operating state of a discharge nozzle as such affects the discharge quantity. Therefore, fluctuations in the discharge amount that are attributable to the operating state can be reduced.

In the liquid discharge device as described above, the deposit pattern setting section is preferably configured to set the arrangement pattern so that a shape obtained by connecting an outermost periphery of landing positions of the liquid within one of the target discharge partitioned areas has a maximum surface area.

According to this liquid discharge device, the landing positions are set so as obtain a maximum surface area of a polygonal shape connecting the landing positions of the outermost periphery of a predetermined number of landing positions. The region in which the liquid is deposited thereby becomes the maximum area and the size of the region in which the liquid is deposited in the target discharge partitioned area becomes the maximum area. Therefore, deposited liquid can readily wet and spread over the entire surface of the target discharge partitioned area. When the liquid is deposited in the target discharge partitioned area, and the region in which the liquid is to be made to wet and spread is greater in size than the target discharge partitioned area, the liquid can still readily wet and spread over the entire surface of the region.

In the liquid discharge device as described above, the deposit pattern setting section is preferably configured to set the arrangement pattern so that a shape obtained by connecting an outermost periphery of landing positions of the liquid within one of the target discharge partitioned areas has a minimum surface area.

According to this liquid discharge device, the landing positions are set so as obtain a maximum surface area of a polygonal shape connecting the landing positions of the outermost periphery of a predetermined number of landing positions. The region in which the liquid is deposited thereby becomes the minimum area and the size of the region in which the liquid is deposited in the target discharge partitioned area becomes the minimum area. Therefore, the distance between the landing positions and the partition position of the outer shape of the target discharge partitioned area can be maximized in terms of average distance. The possibility that the liquid will land in a position outside of the target discharge partitioned area can be reduced when the liquid is deposited.

In the liquid discharge device as described above, the deposit pattern setting section is preferably configured to set the arrangement pattern so that a maximum number of the discharge nozzles is selected to be used to deposit the liquid within one of the target discharge partitioned areas.

According to this liquid discharge method, the number of discharge nozzles to be used for causing liquid to land in a predetermined number of landing positions is maximal. The discharge amount of the discharge nozzles varies within a specified range and is different for each discharge nozzle. The effect that the discharge amount variation of each of the discharge nozzles has on the amount of liquid deposited in each of the target discharge partitioned areas can be reduced by using a large number of discharge nozzles. Therefore, it is possible to reduce the variation in the amount of liquid deposited in the target discharge partitioned areas due to variation in the discharge amount of the discharge nozzles.

In the liquid discharge device as described above, the deposit pattern setting section is preferably configured to set the arrangement pattern so that a minimum number of the discharge nozzles is selected to be used to deposit the liquid within one of the target discharge partitioned areas.

According to this liquid discharge method, the number discharge nozzles to be used for causing liquid to land in a predetermined number of landing positions is minimal. The discharge amount of the discharge nozzles varies within a specified range and is different for each discharge nozzle. Adjustment is carried out using a fixed number of discharge nozzles as a set when the discharge amount of the discharge nozzles is adjusted, and it is therefore very likely that there will be low variability in the discharge amount between discharge nozzles adjusted in the same set. It is also very likely that the difference in discharge amounts will be small because the peripheral conditions are very likely to be substantially the same between discharge nozzles formed in close proximity. The number of discharge nozzles to be used is reduced, whereby it is very likely that the discharge nozzles adjusted as the same set or the discharge nozzles formed in close proximity will be used. Since it is very likely that there will be low variability in the discharge amounts of the discharge nozzles to be used, the variability in the amount of liquid to be deposited in the target discharge partitioned areas can be reduced.

In the liquid discharge device as described above, the deposit pattern setting section is preferably configured to set the arrangement pattern so that the discharge nozzles arranged adjacent to each other are selected to deposit the liquid within the one of the target discharge partitioned areas.

According to this liquid discharge method, the discharge nozzles to be used for causing liquid to land in a predetermined number of landing positions are the discharge nozzles arranged adjacent to each other. The discharge amount of the discharge nozzles varies within a specified range and is different for each discharge nozzle. Adjustment is carried out using a fixed number of discharge nozzles as a set when the discharge amount of the discharge nozzles is adjusted, and it is therefore very likely that there will be low variability in the discharge amount between discharge nozzles adjusted in the same set. It is also very likely that the difference in discharge amounts is small because the peripheral conditions are very likely to be substantially the same between discharge nozzles formed in close proximity. The discharge nozzles formed in closest proximity are used by setting the discharge nozzles to be used to be the discharge nozzles arranged adjacent to each other. It is also very likely that adjustment will be carried out in the same set. Since it is very likely that there will be low variability in the discharge amounts of the discharge nozzles to be used, the variability in the amount of liquid to be deposited in the target discharge partitioned areas can be reduced.

BRIEF DESCRIPTION OF THE DRAWINGS

Referring now to the attached drawings which form a part of this original disclosure:

FIG. 1 is a perspective view of the external appearance showing an overall configuration of the droplet discharge device;

FIG. 3 is a plan view showing the general configuration of the head unit;

FIG. 7(*a*) is a descriptive view showing the arrangement positions of the discharge nozzles, FIG. 7(*b*) is a descriptive view showing the state in which droplets have landed in a rectilinear shape in the direction in which the nozzle rows extend, FIG. 7(*c*) is a descriptive view showing the state of droplets landed in a rectilinear shape in the main scanning direction, and FIG. 7(*d*) is a descriptive view showing a state in which droplets have landed in a planar shape;

FIG. 12 is a cross-sectional view showing the steps for forming a filter film in the process for forming a liquid crystal display panel;

FIG. 13 is a cross-sectional view showing the steps for forming an alignment film in the process for forming a liquid crystal display panel;

FIG. 17 is a descriptive view showing the relationship between landing point region, the possible landing positions, and the arrangement map.

DETAILED DESCRIPTION OF EXEMPLARY EMBODIMENTS

Figure 2A:
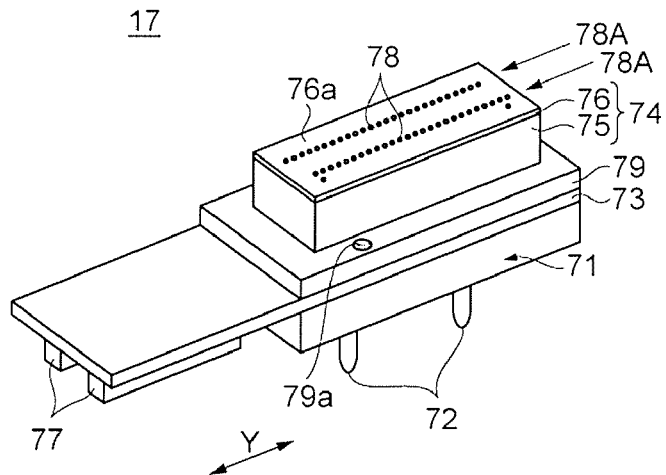
FIG. 2A is a perspective view of the external appearance of the droplet discharge head as viewed from the nozzle plate side.

Preferred embodiments of the liquid discharge method and the liquid discharge device are described below with reference to the drawings using as an example a droplet discharge device having an inkjet droplet discharge head as an embodiment of a discharge head. For the sake of convenience in the drawings referred to in the description below, there are cases in which the lengthwise and crosswise scaling of members or portions are different from the actual members or portions.

Droplet Discharge Method

The droplet discharge method used in the formation of a filter film or another functional film will be described first. The droplet discharge method has an advantage in that a desired amount of material can be deposited with good accuracy in a desired position without wasteful usage of the material. Examples of the discharge technique of the droplet discharge method include an electrification control scheme, a pressurized vibration scheme, an electrothermal conversion scheme, and an electrostatic attraction scheme.

Among these, an electromechanical conversion scheme makes use of the property in which a piezoelement (piezoelectric element) receives a pulse-like electric signal and deforms. The deformation of the piezoelement applies pressure via a member formed from a material having flexibility in a space in which the liquid material is stored, liquid material is pushed from the space and discharged from the discharge nozzle. The piezo scheme does not heat the liquid material and therefore has an advantage in that the size of the droplets can be readily adjusted by adjusting the drive voltage and the composition or the like of the material is not affected. In the present embodiment, since the composition or the like of the material is not affected, the degree of freedom in selecting the liquid material is high and the size of the droplets can be readily adjusted. Therefore, the piezo scheme is used because the controllability of the droplets is good.

Droplet Discharge Device

Next, the overall configuration of the droplet discharge device 1 provided with a droplet discharge head 17 will be described with reference to FIG. 1. FIG. 1 is a perspective view of the external appearance showing the general configuration of the droplet discharge device.

The droplet discharge device 1 is provided with a head mechanism section 2, a workpiece mechanism section 3, a functional liquid feed section 4, and a maintenance device section 5, as shown in FIG. 1. The head mechanism section 2 has a droplet discharge head 17 for discharging as droplets a functional liquid acting as the liquid. The workpiece mechanism section 3 has a workpiece stage 23 for mounting a workpiece 20 as the discharge target of the droplets discharged from the droplet discharge head 17. The functional liquid feed section 4 has a relay tank and liquid feed tube. The liquid feed tube is connected to the droplet discharge head 17, and functional liquid is fed to the droplet discharge head 17 via the liquid feed tube. The maintenance device section 5 is provided with devices for carrying out inspection and maintenance of the droplet discharge head 17. The droplet discharge device 1 is provided with a discharge device control section 6 for providing overall control of these mechanisms and the like.

The droplet discharge device 1 is provided with a plurality of support legs 8 disposed on the floor, and a surface plate 9 disposed on the obverse side of the support legs 8. The workpiece mechanism section 3 is disposed on the obverse side of the surface plate 9 so as to extend in the lengthwise direction (X-axis direction) of the surface plate 9. The head mechanism section 2 supported by two support columns secured to the surface plate 9 is disposed above the workpiece mechanism section 3 so as to extend in the direction orthogonal (Y-axis direction) to the workpiece mechanism section 3. A functional liquid tank or the like of the functional liquid feed section 4, which has a feed tube that is in communication with the droplet discharge head 17 of the head mechanism section 2, is disposed to the side of the surface plate 9. The maintenance device section 5 is disposed in the vicinity of one of the support columns of the head mechanism section 2 in the X-axis direction in alignment with the workpiece mechanism section 3. The discharge device control section 6 is furthermore accommodated below the surface plate 9.

The head mechanism section 2 is provided with a head unit 21 having the droplet discharge head 17, a head carriage 25 having the head unit 21, and a movement frame 22 from which the head carriage 25 is suspended. The droplet discharge head 17 is freely moved in the Y-axis direction by moving the movement frame 22 in the Y-axis direction using a Y-axis table 12 (see FIG. 4), and is held in the moved position. The workpiece mechanism section 3 freely moves the workpiece stage 23 in the X-axis direction using an X-axis table 11 (see FIG. 4) whereby the workpiece 20 mounted on the workpiece stage 23 is moved in the X-axis direction, and is held in the moved position.

In this manner, the droplet discharge head 17 moves to the discharge position in the Y-axis direction and stops, and the functional liquid is discharged as droplets in synchronization with the movement of the workpiece 20 below in the X-axis direction. Droplets can be made to land in any position on the workpiece 20 by controlling the relative movement of the workpiece 20 that moves in the X-axis direction and the droplet discharge head 17 that moves in the Y-axis direction, whereby desired plane-shaped drawing can be carried out.

Droplet Discharge Head

Figure 2B:
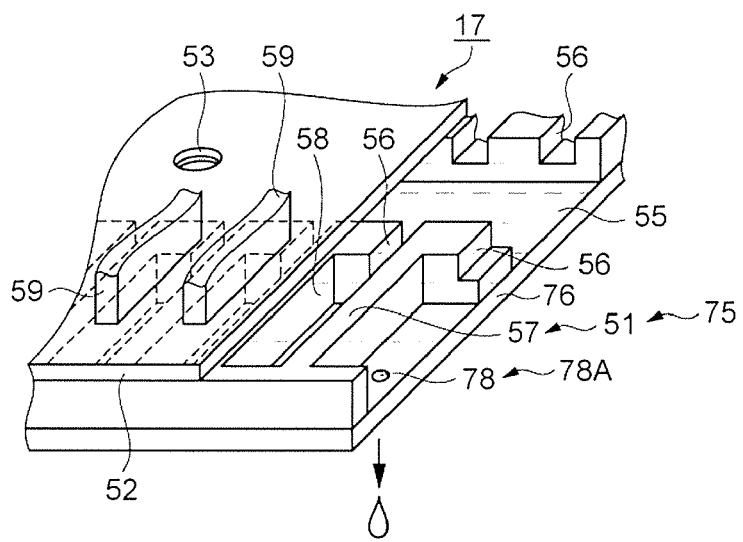
FIG. 2B is a perspective cross-sectional view showing the structure around the pressure chamber of the droplet discharge head.
Figure 2C:
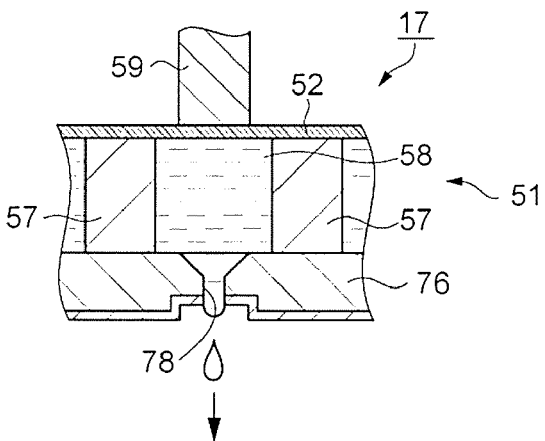
FIG. 2C is a cross-sectional view showing the structure of the discharge nozzle section of the droplet discharge head.

Next, the droplet discharge head 17 will be described with reference to FIGS. 2A to 2C. FIG. 2 is a view showing the configuration of the droplet discharge head. FIG. 2A is a perspective view of the external appearance of the droplet discharge head as viewed from the nozzle plate side, FIG. 2B is a perspective cross-sectional view showing the structure around the pressure chamber of the droplet discharge head, and FIG. 2C is a cross-sectional view showing the structure of the discharge nozzle section of the droplet discharge head;

The droplet discharge head 17 is a so-called two-row head, and is provided with a liquid introduction section 71 having two connection needles 72, 72, as well as a head substrate 73 extended lateral to the liquid introduction section 71, a pump section 75 extending to the liquid introduction section 71, and a nozzle plate 76 extending to the pump section 75. A tube connection member is connected to each of the connection needles 72 of the liquid introduction section 71, the liquid feed tube is connected via the tube connection member, and functional liquid is fed from the functional liquid feed section 4 connected to the liquid feed tube. A pair of head connectors 77, 77 is mounted on the head substrate 73, and a flexible flat cable (FFC cable) is connected via the head connector 77. A quadrangular head main body 40A is composed of the case head 48 and the nozzle plate 41. The droplet discharge head 17 is connected to the discharge device control section 6 via the FFC cable, and signals are transceived via the FFC cable. A substantially quadrangular head main body 74 is composed of the pump section 75 and the nozzle plate 76.

The base section side of the pump section 75, i.e., the base section side of the head main body 74 has a flange section 79 formed in the shape of a quadrangular flange for seating the liquid introduction section 71 and the head substrate 73. A pair of screw holes (female screws) 79a for small screws for securing the droplet discharge head 17 is formed in the flange section 79. The droplet discharge head 17 is secured to a head-holding member by head setscrews threaded into the screw holes 79a through the head-holding member for holding the droplet discharge head 17.

There are two nozzle rows 78A formed on a nozzle formation surface 76a of the nozzle plate 76. The nozzle rows 78A are formed on the nozzle plate 76 and are composed of discharge nozzles 78 for discharging liquid. The two nozzle rows 78A are arranged parallel to each other, each of the nozzle rows 78A composed of, e.g., 180 (shown schematically in the drawings) discharge nozzles 78 aligned at an equal pitch. In other words, two nozzle rows 78A are arranged on the two sides of the centerline in the nozzle formation surface 76a of the head main body 74.

The nozzle rows 78A extend in the Y-axis direction when the droplet discharge head 17 has been mounted on the droplet discharge device 1. The discharge nozzles 78 constituting the two nozzle rows 78A are positionally offset by half a nozzle pitch from each other in the Y-axis direction. A single nozzle pitch is, e.g., 140 μm. Droplets discharged from the discharge nozzles 78 constituting each of the nozzle rows 78A are designed to land in the same position in the X-axis direction in a rectilinear fashion in alignment with the Y-axis direction at equidistance intervals. In the case that the nozzle pitch of the discharge nozzles 78 in the nozzle rows 78A is 140 μm, the center distance of the landing positions extending in the stated rectilinear fashion is designed to be 70 μm.

The droplet discharge head 17 has a pressure chamber plate 51 that constitutes the pump section 75 and is layered on the nozzle plate 76, and has a vibration plate 52 layered on the pressure chamber plate 51, as shown in FIGS. 2(b) and 2(c).

A liquid reservoir 55 constantly filled with functional liquid fed from the liquid introduction section 71 via a liquid feed hole 53 of the vibration plate 52 is formed in the pressure chamber plate 51. The liquid reservoir 55 is a space enclosed by the vibration plate 52, the nozzle plate 76, and the walls of the pressure chamber plate 51. A pressure chamber 58 partitioned by a plurality of head partition walls 57 is formed in the pressure chamber plate 51. The space enclosed by the vibration plate 52, the nozzle plate 76, and two head partition walls 57 is the pressure chamber 58.

The pressure chamber 58 is provided in correspondence with each of the discharge nozzles 78, and the number of pressure chambers 58 and the number of discharge nozzles 78 are the same. Functional liquid from the liquid reservoir 55 is fed to the pressure chamber 58 via a feed port 56 positioned between the two head partition walls 57. The assemblies of the head partition walls 57, the pressures chamber 58, the feed ports 56 are aligned in a single row along the liquid reservoir 55, and the discharge nozzles 78 aligned in a single row form a nozzle row 78A. Although not shown in FIG. 2B, discharge nozzles 78 arranged in a single row form another nozzle row 78A in a substantially symmetrical position in relation to the liquid reservoir 55, and assemblies of the corresponding head partition walls 57, pressure chambers 58, and feed ports 56 are aligned in a single row with respect to the nozzle rows 78A that include the depicted discharge nozzles 78.

One end of piezoelectric elements 59 is secured to each of the portions constituting the pressure chamber 58 of the vibration plate 52. The other end of the piezoelectric elements 59 is secured to a base (not shown) for supporting the entire droplet discharge head 17 via the element electrode 54 (see FIG. 6B).

The piezoelectric elements 59 have active sections obtained by layering an electrode layer and a piezoelectric material, and the active sections contract in the lengthwise direction (the thickness direction of the vibration plate 52 in FIG. 2B or 2(c)) when a drive voltage is applied to the electrode layer. When the active sections contract, a force is received that pulls the vibration plate 52 secured to one end of the piezoelectric elements 59 to the opposite side of the pressure chamber 58. The vibration plate 52 is pulled toward the opposite side of the pressure chamber 58, whereby the vibration plate 52 flexes toward the opposite side of the pressure chamber 58. Since the volume of the pressure chamber 58 is thereby increased, the functional liquid is fed from the liquid reservoir 55 to the pressure chamber 58 via the feed port 56. Next, when the drive voltage applied to the electrode layer is discontinued, the active section returns to the original length, whereby the piezoelectric element 59 presses the vibration plate 52. The vibration plate 52 is pressed and made to return to the pressure chamber 58 side. The volume of the pressure chamber 58 thereby rapidly returns to the original state, i.e., the increased volume is reduced. Therefore, pressure is applied to the functional liquid present in the pressure chamber 58, and the pressurized liquid is discharged as a droplet from the nozzle 78 formed in communication with the pressure chamber 58.

The discharge device control section 6 controls the discharge of functional liquid from the discharge nozzles 78 by controlling the voltage applied to the piezoelectric elements 59, i.e., controlling the drive signals. More specifically, the volume of the droplets discharged from the discharge nozzles 78, the number of droplets discharged per unit of time, and other factors can be varied. Therefore, the distance between the droplets that have landed on the substrate, the amount of functional liquid that has been made to land in a fixed surface area on the substrate, and other factors can be varied. For example, a plurality of droplets can be simultaneously discharged at the pitch interval of the discharge nozzles 78 in a range of the length of the nozzle rows 78A in the direction in which the nozzle rows 78A extend by selectively using the discharge nozzles 78 for discharging droplets from among the plurality of discharge nozzles 78 aligned in the nozzle rows 78A. In the direction substantially orthogonal to the direction in which the nozzle rows 78A extend, the substrate and the discharge nozzles 78 are moved in a relative fashion and droplets discharged from the discharge nozzles 78 can be deposited in any position in the directions of relative movement on the substrate that the discharge nozzles 78 are capable of facing. The volume of the droplets discharged from the discharge nozzles 78 is variable between, e.g., 1 pL to 300 pL (picoliter).

Head Unit

Next, the general configuration of the head unit 21 provided to the head mechanism section 2 will be described with reference to FIG. 3. FIG. 3 is a plan view showing the general configuration of the head unit. The X-axis and Y-axis shown in FIG. 3 match the X-axis and Y-axis shown in FIG. 1 in a state in which the head unit 21 is mounted on the droplet discharge device 1.

The head unit 21 has a carriage plate 61, and six droplet discharge heads 17 mounted on the carriage plate 61, as shown in FIG. 3. The droplet discharge head 17 is secured to the carriage plate 61 via a head holding member (not shown), the head main body 74 is loosely fitted into a hole (not shown) formed in the carriage plate 61, and the nozzle plate 76 (head main body 74) protrudes from the surface of the carriage plate 61. FIG. 3 is a view as seen from the nozzle plate 76 (nozzle formation surface 76a) side. The six droplet discharge heads 17 are formed in to two head assemblies 62 having three droplet discharge heads 17 each separated in the Y-axis direction. The nozzle rows 78A of the droplet discharge head 17 extend in the Y-axis direction in a state in which the head unit 21 is mounted on the droplet discharge device 1.

The three droplet discharge heads 17 of one of the head assemblies 62 are positioned in positions in which the discharge nozzles 78 at the end of one of the droplet discharge heads 17 are offset by a half nozzle pitch with respect to the discharge nozzles 78 at the end of the other droplet discharge head 17 among the droplet discharge heads 17 mutually adjacent in the Y-axis direction. Even when the positions in the X-axis direction of all the discharge nozzles 78 are the same in the three droplet discharge heads 17 of the head assembly 62, the discharge nozzles 78 are aligned at equidistant intervals of the half nozzle pitch in the Y-axis direction. In other words, the droplets discharged in the same positions in the X-axis direction from the discharge nozzles 78 constituting the nozzle rows 78A of the droplet discharge heads 17 are designed to land in a rectilinear fashion in alignment with the Y-axis direction at equidistant intervals. The head assembly 62 is configured so as to be aligned in a stepwise fashion in the X-axis direction because the droplet discharge heads 17 mutually overlap in the Y-axis direction.

Electrical Configuration of Droplet Discharge Device

Figure 4:
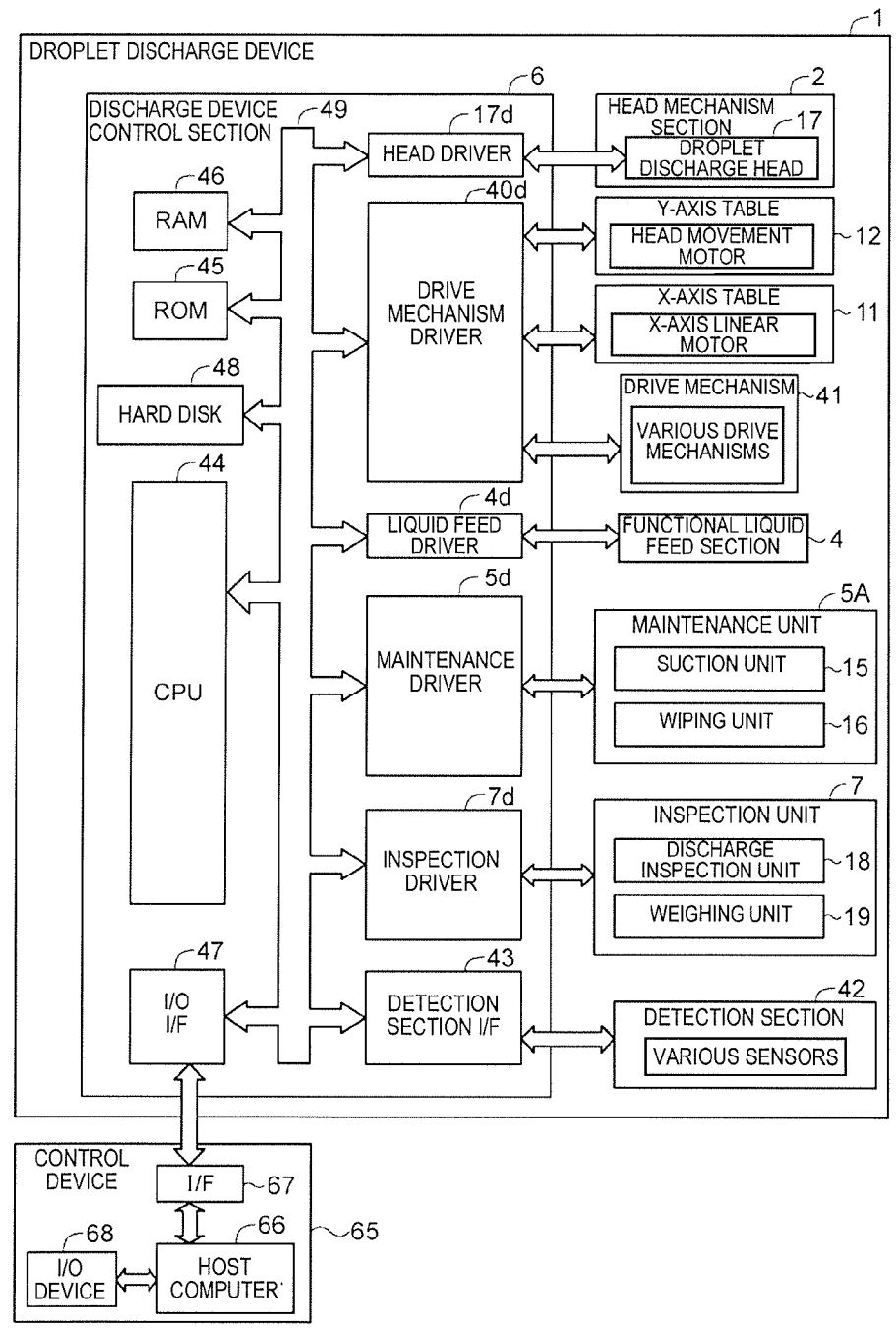
FIG. 4 is an electrical configuration block diagram showing the electrical configuration of the droplet discharge device.

Next, the electrical configuration for driving a droplet discharge device 1 having configuration such as that described above will be described with reference to FIG. 4. FIG. 4 is an electrical configuration block diagram showing the electrical configuration of the droplet discharge device. The droplet discharge device 1 is controlled by the input of data, as well as operation start, stop, and other command instructions via a control device 65. The control device 65 has a host computer 66 for performing computational processes, and an I/O device 68 for inputting and outputting information to the droplet discharge device 1, and is connected to the discharge device control section 6 via an interface (I/F) 67. The I/O device 68 is a keyboard that can input information, an external I/O device for inputting and outputting information via a recording medium, a recording section for saving information inputted via the external I/O device, a monitor device, or the like.

The discharge device control section 6 of the droplet discharge device 1 has an I/O interface (I/F) 47, a CPU (central processing unit) 44, a ROM (read only memory) 45, a RAM (random access memory) 46, and a hard disk drive 48. Also provided are a head driver 17*d*, a drive mechanism driver 40*d*, a liquid feed driver 4*d*, a maintenance driver 5*d*, an inspection driver 7*d*, and a detection section interface (I/F) 43. These components are electrically connected to each other via a data bus 49.

The I/O interface 47 performs data transfers with the control device 65. The CPU 44 performs various computational processes on the basis of commands from the control device 65 and outputs control signals for controlling the operation of each section of the droplet discharge device 1. The RAM 46 temporarily stores print data and control commands received from the control device 65 in accordance with commands from the CPU 44. The ROM 45 stores routines or the like that are used by the CPU 44 to perform various computational processes. The hard disk drive 48 stores print data and control commands received from the control device 65, and stores routines or the like that are used by the CPU 44 to perform various computational processes.

A droplet discharge head 17 constituting the head mechanism section 2 is connected to the head driver 17*d*. The head driver 17*d* drives the droplet discharge head 17 and causes droplets of the functional liquid to be discharged in accordance with control signals from the CPU 44. Connected to the drive mechanism driver 40*d* are: a head movement motor of a Y-axis table 12, an X-axis linear motor of an X-axis table 11, and a drive mechanism 41 that includes various drive mechanisms having various drive sources. The various drive mechanisms include a camera movement motor for moving an alignment camera, a θ drive motor of the workpiece stage 23, and other drive motors. The drive mechanism driver 40*d* drives the above-described motors or the like in accordance with control signals from the CPU 44, causes the droplet discharge head 17 and the workpiece 20 to move in a relative fashion, causes the droplet discharge head 17 to face an arbitrary position of the workpiece 20, and causes a droplet of the liquid to land in an arbitrary position on the workpiece 20 so as to deposit a droplet in a predetermined position.

Connected to the maintenance driver 5*d* are a wiping unit 16, and a suction unit 15 of a maintenance unit 5A constituting the maintenance device section 5. The maintenance driver 5*d* drives the suction unit 15 or the wiping unit 16 in accordance with control signals from the CPU 44, and carries out maintenance operations for the droplet discharge head 17.

Connected to the inspection driver 7*d* are a weighing unit 19, and a discharge inspection unit 18 of an inspection unit 7, as well as other units. The inspection driver 7*d* drives the discharge inspection unit 18 in accordance with control signals from the CPU 44, and inspects the presence of a discharge, landing position accuracy, and other discharge states of the droplet discharge head 17. The inspection driver 7*d* also drives the weighing unit 19 and weighs the discharge as the weight of the droplet of liquid discharged from the droplet discharge head 17. The discharge weight in the present embodiment is the weight of a single droplet of functional liquid discharged by the droplet discharge head 17. The size (volume) of the single droplet of functional liquid discharged by the droplet discharge head 17 is referred to as the discharge amount. The discharge weight and the discharge amount each refer to the same quantity in terms of weight or volume.

The functional liquid feed section 4 is connected to the liquid feed driver 4*d*. The liquid feed driver 4*d* drives the functional liquid feed section 4 in accordance with control signals from the CPU 44 and feeds functional liquid to the droplet discharge head 17. A detection section 42 that includes various sensors is connected to the detection section interface 43. The detection information detected by the sensors of the detection section 42 is transmitted to the CPU 44 via the detection section interface 43.

Discharge of Functional Liquid

Figure 5:
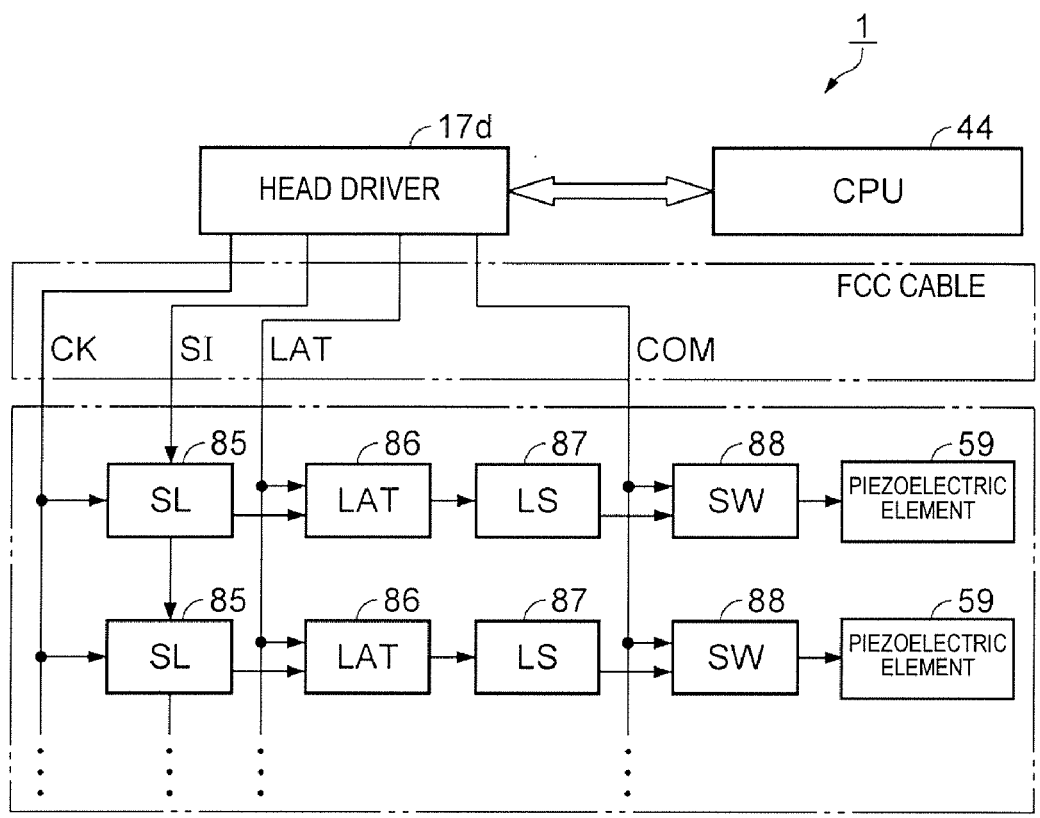
FIG. 5 is a descriptive view showing the electrical configuration of the droplet discharge head and the flow of signals.

Next, the method for controlling discharge in the droplet discharge device 1 will be described with reference to FIG. 5. FIG. 5 is a descriptive view showing the electrical configuration of the droplet discharge head and the flow of signals As described above, the droplet discharge device 1 is provided with a CPU 44 for outputting control signals that control the operation of the each part of the droplet discharge device 1, and a head driver 17*d* for providing electrical drive control of the droplet discharge head 17.

The head driver 17*d* is electrically connected to each droplet discharge head 17 via an FFC cable, as shown in FIG. 5. The droplet discharge head 17 is provided with a shift register (SL) 85, a latch circuit (LAT) 86, a level shifter (LS) 87, and a switch (SW) 88, in correspondence with the piezoelectric element 59 provided to each discharge nozzle 78 (see FIG. 2).

Discharge control in the droplet discharge device 1 is carried out in the following manner. First, the CPU 44 transfers to the head driver 17*d* dot pattern data in which a pattern in which the functional liquid is deposited on the workpiece 20 or another drawing target has been formed into data. The head driver 17*d* decodes the dot pattern data and generates nozzle data, which is the ON/OFF (discharge/non-discharge) information of the discharge nozzles 78. The nozzle data is converted to a serial signal (SI), synchronized with the clock signal (CK), and transmitted to the shift registers 85.

The nozzle data transmitted to the shift registers 85 is latched at timing in which the latch signal (LAT) is inputted to the latch circuit 86, and is converted by the level shifter 87 to a gate signal for the switch 88. In other words, the switch 88 is opened when nozzle data indicates "ON," and a drive signal (COM) is fed to the piezoelectric elements 59. The switch 88 is closed when nozzle data indicates "OFF," and a drive signal (COM) is not fed to the piezoelectric elements 59. Functional liquid is discharged as droplets from the discharge nozzles 78 that correspond to "ON," the discharged droplets of functional liquid land on the workpiece 20 or another drawing target, and the functional liquid is deposited on the drawing target.

The timing for inputting the latch signal (LAT) to the latch circuit 86 is shared for each nozzle row 78A in the droplet discharge head 17, for example, and functional liquid is discharged as droplets at substantially the same time from the discharge nozzles 78 constituting the nozzle rows 78A.

Drive Waveform

Figure 6A:
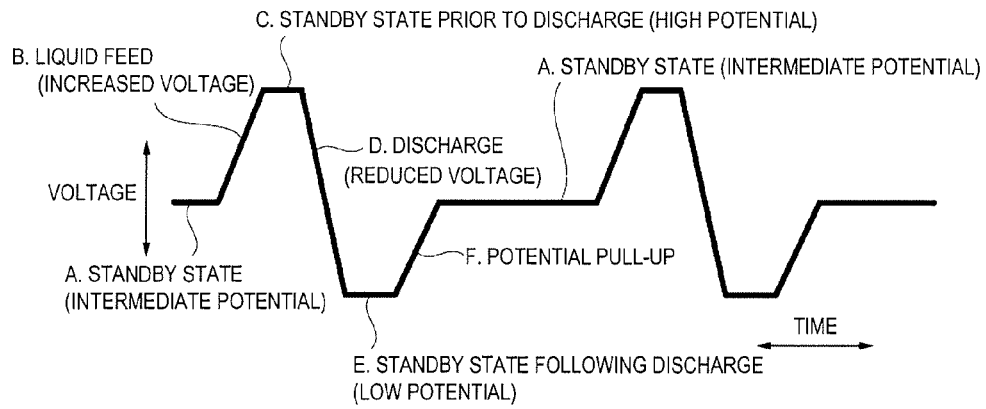
FIG. 6A is a view showing the fundamental waveform of the drive waveform of the drive signal applied to the piezoelectric element.
Figure 6B:
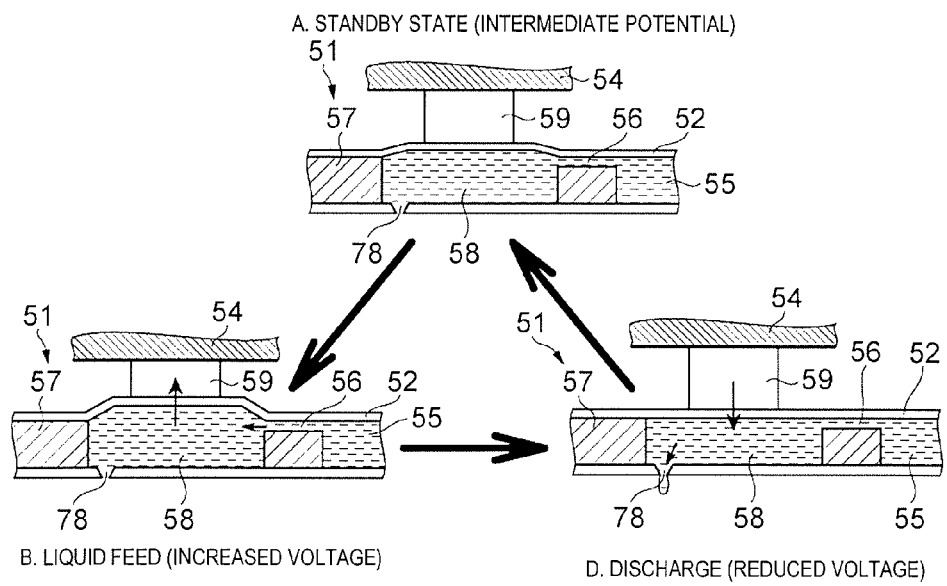
FIG. 6B is a schematic cross-sectional view showing the discharge operation of the droplet discharge head carried out by the piezoelectric element that corresponds to the drive waveform.

Described next with reference to FIGS. 6A and 6B is the discharge operation of the piezoelectric elements 59 to which are applied a drive waveform of the drive signal (COM) applied to the piezoelectric elements 59 and a drive signal of the drive waveform. FIGS. 6A and 6B are diagrams showing the operation of the piezoelectric elements that correspond to the drive waveform and the fundamental waveform of the drive waveform. FIG. 6A is a diagram showing the fundamental waveform of the drive waveform of the drive signal applied to the piezoelectric element; and FIG. 6B is a schematic cross-sectional view showing the discharge operation of the droplet discharge head carried out by the piezoelectric element that corresponds to the drive waveform.

A constant voltage is applied (A of FIG. 6A) to the piezoelectric element 59 in the standby state prior to the application of a drive signal, as shown in FIG. 6A. This voltage will be referred to as an intermediate potential. The voltage applied to the piezoelectric element 59 is raised to the intermediate potential prior to the start of drawing when drawing is to be carried out, and is returned to a ground level after drawing has been carried out.

The piezoelectric element 59 slightly contracts and the vibration plate 52 is pulled toward the piezoelectric element 59 in a state in which the piezoelectric element 59 has been kept at the intermediate potential, whereby the vibration plate 52 flexes (A of FIG. 6B) toward to the opposite side of the pressure chamber 58, as shown in FIG. 6B.

In the first step of the drive cycle, the voltage applied to the piezoelectric element 59 begins from the intermediate potential and is raised to a high potential (voltage increase, B or FIG. 6A). The voltage applied to the piezoelectric element 59 increases, whereby the piezoelectric element 59 contracts further and the vibration plate 52 receives a force that pulls toward the opposite side of the pressure chamber 58. When the vibration plate 52 is pulled toward the opposite side of the pressure chamber 58, the vibration plate 52, being formed from a flexible material, flexes toward the opposite side of the pressure chamber 58. Functional liquid is thereby fed from the liquid reservoir 55 to the pressure chamber 58 via the feed ports 56 ((liquid feed), B of FIG. 6B) because the volume of the pressure chamber 58 has been increased. This step will be referred to as the voltage increase/liquid feed step. In the voltage increase/liquid feed step, the piezoelectric element 59 is made to slowly displace so that air does not enter from the discharge nozzles 78 into the pressure chamber. The voltage of the high potential applied to the piezoelectric element 59 corresponds to the drive voltage applied for driving the droplet discharge head 17.

As described above, droplets of the functional liquid are discharged at substantially the same time from the discharge nozzles 78 constituting the nozzle rows 78A. Therefore, the timing at which the vibration plate 52 is pulled toward the opposite side of the pressure chamber 58 is also substantially the same timing in all the discharge nozzles 78 constituting the nozzle rows 78A. The vibration plate 52 forming the pressure chamber 58 is shared by all the discharge nozzles 78 constituting the nozzle rows 78A. Accordingly, a slight fluctuation is possible in the flexing shape and flexing distance of the portion that forms the pressure chambers 58 of the vibration plate 52 toward the opposite side of the pressure chamber 58, depending on whether adjacent nozzle rows 78A or the nozzle rows 78A in proximal positions are to carry out the discharge. In other words, there is a possibility that the discharge amount from the discharge nozzles 78 will slightly fluctuate.

After the voltage increase/liquid feed step, the voltage applied to the piezoelectric element 59 is kept at a high potential. This state will be referred to as the standby state prior to discharge (C of FIG. 6A). The piezoelectric material constituting the piezoelectric element 59 undergoes residual mechanical vibrations even after the change in voltage has ended. Therefore, the step for waiting until the mechanical vibrations to subside is the standby state prior to discharge.

After the standby state prior to discharge has been maintained for a time commensurate with the subsiding of the mechanical vibrations, the voltage applied to the piezoelectric element 59 is reduced in a single operation (D of FIG. 6A). The displacement of the piezoelectric element 59 is set to zero in a single operation by reducing the voltage applied to the piezoelectric element 59 in a single operation. The pressure chamber 58 rapidly narrows and the functional liquid filled into the pressure chamber 58 is discharged from the discharge nozzles 78 (D of FIG. 6B). This step will be referred to as the voltage reduction/discharge step.

The amount by which the volume of the pressure chamber 58 increases differs because the distance that the piezoelectric element 59 contracts differs depending on the high potential voltage value. Accordingly, the amount of functional liquid held in and discharged from the pressure chamber 58, i.e., the amount of discharge from the droplet discharge head 17 can be adjusted.

As described above, the droplets of functional liquid are designed to be simultaneously discharged from the discharge nozzles 78 constituting the nozzle rows 78A. Therefore, the timing at which voltage applied to the piezoelectric element 59 is increased to a high potential is also substantially the same timing in the discharge nozzles 78 constituting the nozzle rows 78A. Accordingly, there is a possibility that the high potential voltage value applied to the piezoelectric elements 59 will fluctuate, albeit slightly, depending on the number of discharge nozzles 78 used for carrying out the discharge from the nozzle rows 78A. In other words, there is a possibility that the discharge amount from the discharge nozzles 78 will slightly fluctuate.

Following the voltage reduction/discharge step, the state in which the voltage applied to the piezoelectric element 59 is kept in a state of low potential. This state will be referred to as the standby state following discharge (E of FIG. 6A). The step for maintaining the low potential state for a time commensurate with the subsiding of the mechanical vibrations is the standby state following discharge.

After the standby state following discharge has been maintained for a time commensurate with the subsiding of the mechanical vibrations of the piezoelectric element 59, the voltage applied to the piezoelectric element 59 is increased to the intermediate potential (F of FIG. 6A), thereby restoring the standby state (intermediate potential).

Landing Positions

Described next is the relationship between the discharge nozzles 78 and the landing positions of the droplets discharged from the discharge nozzles 78. FIG. 7 is a descriptive view showing the relationship between the discharge nozzles and the landing positions of the droplets discharged from the discharge nozzles. FIG. 7(*a*) is a descriptive view showing the arrangement positions of the discharge nozzles. FIG. 7(*b*) is a descriptive view showing the state in which droplets have landed in a rectilinear shape in the direction in which the nozzle rows extend. FIG. 7(*c*) is a descriptive view showing the state of droplets landed in a rectilinear shape in the main scanning direction. FIG. 7(*d*) is a descriptive view showing a state in which droplets have landed in a planar shape. The X- and Y-axes shown in FIG. 7 match the X- and Y-axes shown in FIG. 1 in a state in which the head unit 21 is mounted in the droplet discharge device 1. The droplets can be made to land in arbitrary positions in the X-axis direction by discharging droplets of the liquid in arbitrary positions while the discharge nozzles 78 are moved in a relative fashion with respect to the workpiece 20 in the direction of the arrow a shown in FIG. 7, wherein the X-axis direction is the main scanning direction.

The discharge nozzles 78 constituting the nozzle rows 78A are arranged at the center distance of the nozzle pitch P in the Y-axis direction, as shown in FIG. 7(*a*). As described above, discharge nozzles 78 constituting two nozzle rows 78A are mutually offset in position by ½ nozzle pitch P in the Y-axis direction.

The state of a single landed droplet is shown by the landing point 81 indicating the landing position, and the landing circle 81A indicating the state in which the landed droplet has wet and spread, as shown in FIG. 7(*b*). A straight line that connects the landing circles 81A is formed at a center interval of ½ the nozzle pitch P by discharging droplets from all of the discharge nozzles 78 of the two nozzle rows 78A at a timing for depositing liquid on a virtual line L indicated by the alternate long and short dash line in FIG. 7(*b*).

The straight line connecting the landing circles 81A is formed in the X-axis direction by discharging droplets in consecutive fashion from a single discharge nozzle 78, as shown in FIG. 7(*c*). The smallest value of the center distance between the landing points 81 in the X-axis direction will be referred to as the minimum landing distance d. The minimum landing distance d is the sum of the relative movement speed (movement distance/movement time) in the main scanning direction and the shortest discharge interval (time) of the discharge nozzles 78.

The shortest discharge interval of the discharge nozzles 78 is the interval in which the latch signal (LAT) described above is inputted to the latch circuit 86.

A landing surface in the straight line connecting the landing circles 81A aligned in the X-axis direction is formed at center intervals of ½ the nozzle pitch P by discharging droplets with a timing in which the liquid is made to land on the imaginary lines L1, L2, L3 shown by the alternate long and short dash line, as shown in FIG. 7(*d*). The landing points 81 for the case in which distance between the imaginary lines L1, L2, L3 shown in FIG. 7(*d*) is the minimum landing distance d are positions in which the droplets of functional liquid can be deposited by the droplet discharge device 1.

The positions of the landing points 81 shown in FIG. 7(*d*) are established whether or not droplets are deposited, whereby the arrangement table for specifying positions in which the functional liquid is to be deposited is formed. The arrangement table will be referred to as an arrangement map.

Configuration of Liquid Crystal Display Panel

Next, a liquid crystal display panel will be described as an example of a target object for forming a functional film using the droplet discharge device 1. The liquid crystal display panel (see FIG. 8) 200 is an example of a liquid crystal device, and is a liquid crystal display panel provided with a color filter for a liquid crystal display panel as an example of a color filter.

Figure 8:
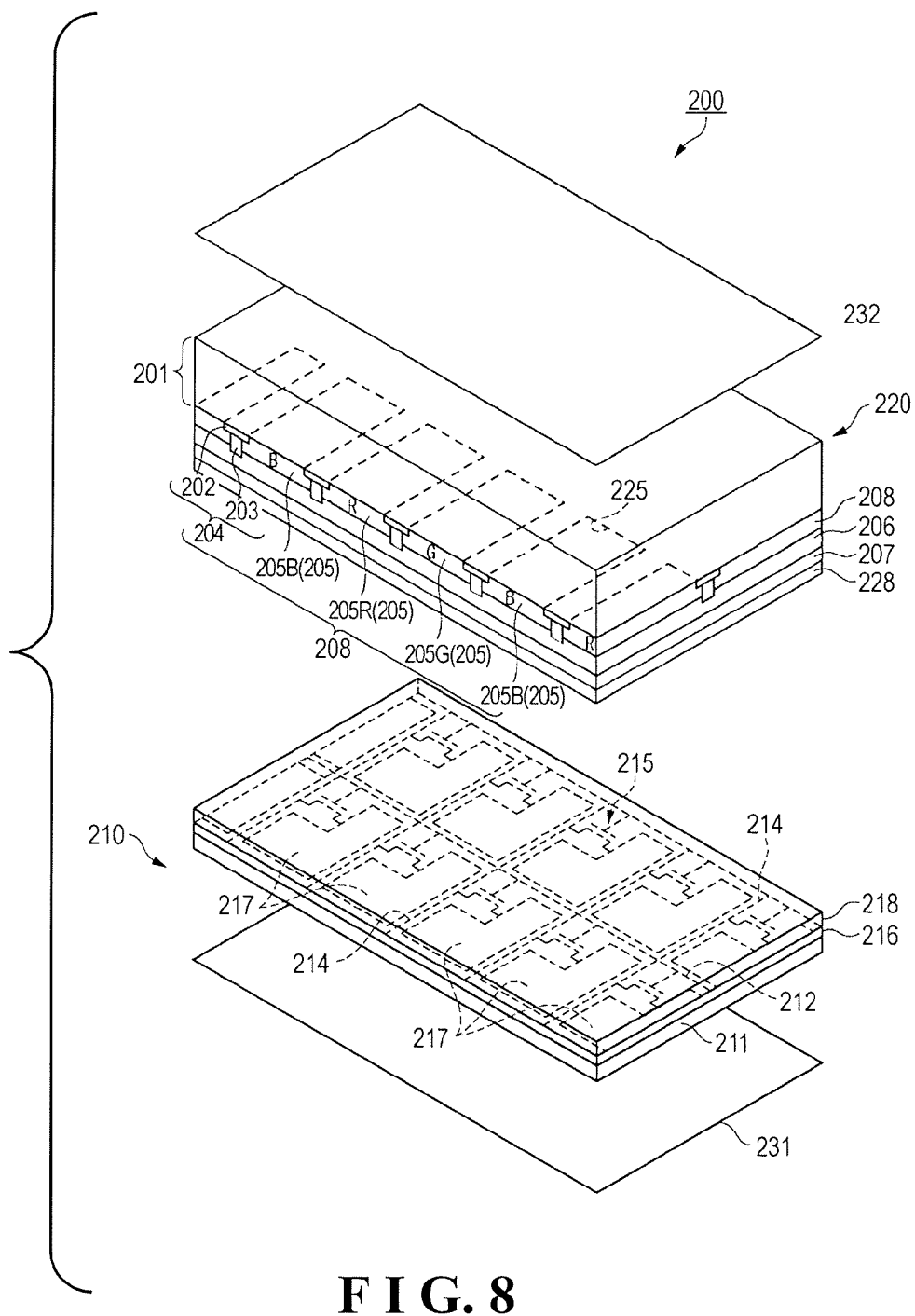
FIG. 8 is an exploded perspective view showing the general configuration of a liquid crystal display panel.

First, the configuration of the liquid crystal display panel 200 will be described with reference to FIG. 8. FIG. 8 is an exploded perspective view showing the general configuration of a liquid crystal display panel. The liquid crystal display panel 200 shown in FIG. 8 is an active matrix-type liquid crystal device that uses thin film transistors (TFT) as the drive elements, and is a transmissive liquid crystal device that uses a backlight (not shown).

The liquid crystal display panel 200 is provided with an element substrate 210 having TFT elements 215, an opposing substrate 220 having opposing electrodes 207, and liquid crystal 230 (see FIG. 13(*k*)) filled between the opposing substrate 220 and the element substrate 210 bonded by a seal material (not shown), as shown in FIG. 8. A polarizing plate 231 and a polarizing plate 232 are disposed on the affixed element substrate 210 and opposing substrate 220, respectively, on the surfaces of the sides opposite from the mutually affixed surfaces.

The element substrate 210 has the TFT elements 215, electroconductive pixel electrodes 217, scan lines 212, and signal lines 214 formed on the surface that faces the opposing substrate 220 of a glass substrate 211. An insulating layer 216 is formed so as to embed the space between the elements and the electroconductive film. The scan lines 212 and the signal lines 214 are formed so as to sandwich portions of the insulating layer 216 in a mutually intersecting state. The scan lines 212 and the signal lines 214 sandwich the portions of the insulating layer 216 therebetween so as to be insulated from each other. The pixel electrodes 217 are formed in the region enclosed by the scan lines 212 and the signal lines 214. The pixel electrodes 217 have a shape in which the corner part of a quadrangular portion is quadrangularly notched. The configuration is one in which the TFT elements 215 provided with source electrodes, drain electrodes, semiconductor sections, and gate electrodes are incorporated into the portions enclosed by the scan lines 212, the signal lines 214, and the pixel electrodes 217. The TFT elements 215 are switched on and off by applying signals to the scan lines 212 and the signal lines 214 to control the energizing of the pixel electrodes 217.

An alignment film 218 that covers the entire region in which the scan lines 212, the signal lines 214, and the pixel electrodes 217 described above are formed is disposed on the surface that is in contact with the liquid crystal 230 of the element substrate 210.

The opposing substrate 220 has a color filter (hereinafter referred to as "CF") layer 208 formed on the surface facing the element substrate 210 of a glass substrate 201. The CF layer 208 has a partition wall 204, a red filter film 205R, a green filter film 205G, and a blue filter film 205B. A black matrix 202 constituting the partition wall 204 is formed in a grid shape on the glass substrate 201, and a bank 203 is formed on the black matrix 202. A quadrangular filter film region 225 is formed by the partition wall 204 composed of the black matrix 202 and the bank 203. The red filter film 205R, the green filter film 205G, or the blue filter film 205B are formed on the filter film region 225. The red filter film 205R, the green filter film 205G, and the blue filter film 205B are formed in the shape of and the position facing the pixel electrodes 217 described above.

A flattened film 206 is disposed on the CF layer 208 (the element substrate 210 side). The opposing electrodes 207 formed from ITO or another transparent electroconductive material is disposed on the flattened film 206. The surface on which the opposing electrodes 207 are formed is made into a substantially flat surface by providing the flattened film 206. The opposing electrodes 207 are formed of a continuous film having a size sufficient for covering the entire region on which the pixel electrodes 217 described above are formed. The opposing electrodes 207 are connected to wiring formed on the element substrate 210 via a conductive part (not shown).

An alignment film 228 that covers the entire surface of at least the pixel electrodes 217 is provided to the surface in contact with the liquid crystal 230 of the opposing substrate 220. The liquid crystal 230 is filled into the space enclosed by a seal member that bonds together the alignment film 228 of the opposing substrate 220, the alignment film 218 of the element substrate 210, and the element substrate 210 of the opposing substrate 220, in a state in which the element substrate 210 and the opposing substrate 220 have been bonded together.

The liquid crystal display panel 200 has a transmissive configuration, but the liquid crystal display panel may be provided with a reflective layer or a semi-transmissive reflective layer so as to be used as a reflective-type liquid crystal device or a semi-transmissive reflective liquid crystal device.

Mother Opposing Substrate

Figure 9A:
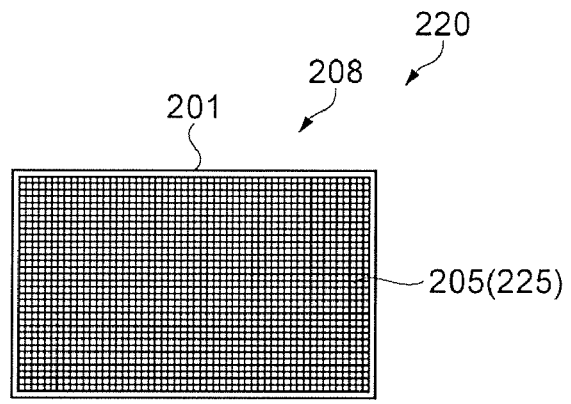
FIG. 9A is a plan view schematically showing the planar structure of an opposing substrate.
Figure 9B:
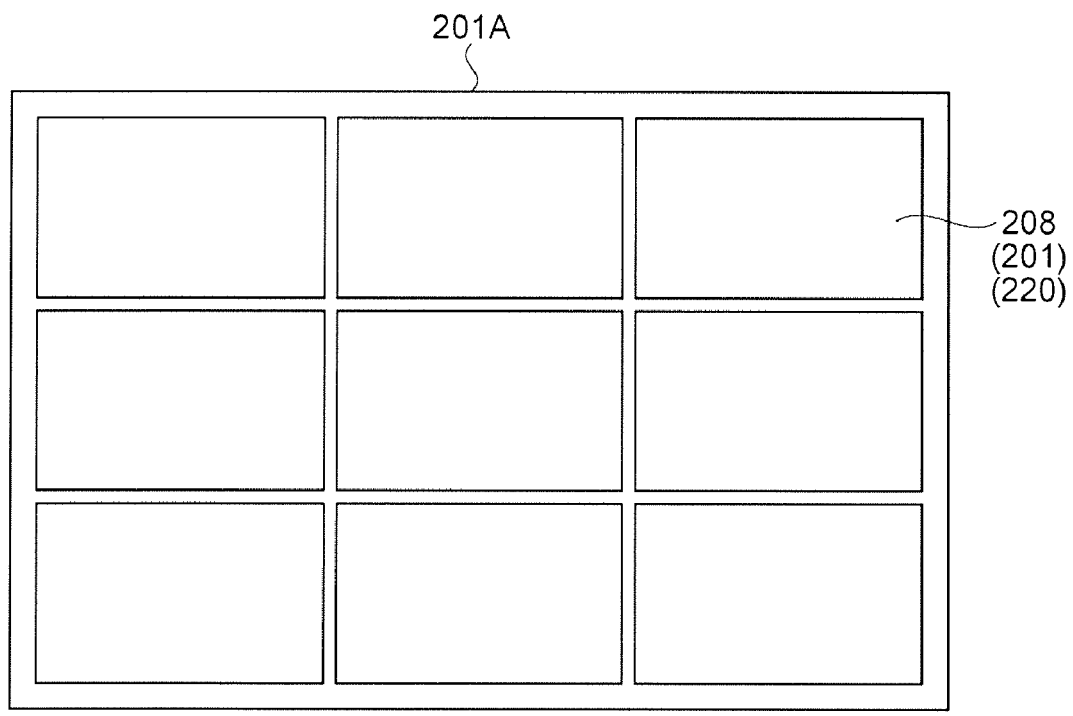
FIG. 9B is a plan view schematically showing the planar structure of a mother opposing substrate.

Next, a mother opposing substrate 201A will be described with reference to FIGS. 9A and 9B. The opposing substrate 220 is divided into sections to form the CF layer 208 or the like described above on the mother opposing substrate 201A acting as the glass substrate 201. The mother opposing substrate 201A is divided and formed into individual opposing substrates 220 (glass substrates 201). FIG. 9A is a plan view schematically showing the planar structure of an opposing substrate, and FIG. 9B is a plan view schematically showing the planar structure of a mother opposing substrate. In the present embodiment, the structure obtained by forming the CF layer 208 or the like on the mother opposing substrate 201A, or the state obtained by forming the CF layer 208 or the like will be referred to as the mother opposing substrate 201A.

The opposing substrate 220 is formed using the glass substrate 201 composed of a transparent quartz glass having a thickness of about 1.0 mm. The opposing substrate 220 has the CF layer 208 formed in portions that do not include a narrow frame region at the periphery of the glass substrate 201, as shown in FIG. 9A. The CF layer 208 is formed by forming a plurality of filter film regions 225 in a dot pattern shape on the surface of the quadrangular glass substrate 201, i.e., a dot matrix shape in the present embodiment, and forming a filter film 205 on the filter film region 225. An alignment mark (not shown) is formed in a position that is not located in the region in which the CF layer 208 of the glass substrate 201 is formed. The alignment mark is used as a reference mark for positioning when the glass substrate 201 is mounted on the manufacturing apparatus of the droplet discharge device 1 or the like or at other times in order to perform various steps for forming the CF layer 208 or the like.

The CF layer 208 of the opposing substrate 220 is formed on the mother opposing substrate 201A in each of the portions that are divided and serve as the glass substrate 201, as shown in FIG. 9B.

Array of Color Filter Films

Figure 10:
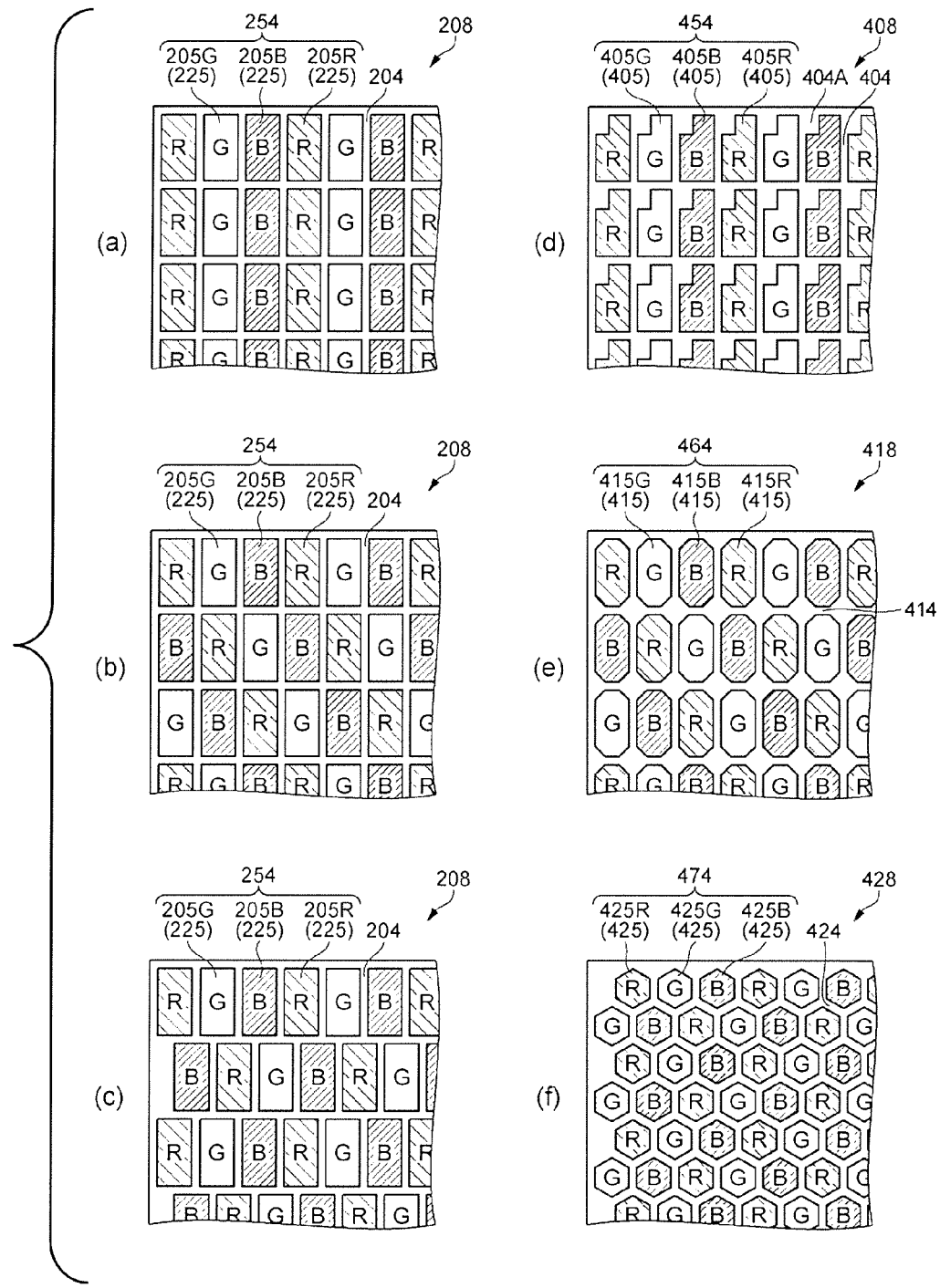
FIG. 10 is a schematic plan view showing an example of an arrangement of filter films of a tricolored color filter.

Described next with reference to FIG. 10 is the array of filter films 205 (the red filter film 205R, the green filter film 205G, and the blue filter film 205B) or the like in the CF layer 208 or the like formed on the opposing substrate 220 or the like. FIG. 10 is a schematic plan view showing an example of an array of filter films of a tricolored color filter The filter film 205 is partitioned by the partition wall 204 formed in a grid-shaped pattern using a non-transmissive resin material and is formed by using color materials to embed a plurality of, e.g., the quadrangular filter film regions 225 aligned in the form of a dot matrix, as shown in FIG. 10. For example, the functional liquid containing color materials that will constitute the filter film 205 is filled into the filter film region 225, and the solvent of the functional liquid is allowed to evaporate and the functional liquid dried to form the film-like filter film 205 for embedding the filter film region 225.

A stripe array, a mosaic array, and a delta array are known examples of formats in which the red filter film 205R, the green filter film 205G, and the blue filter film 205B are arranged in the tri-colored filter.

A strip array is an array composed of the red filter film 205R, the green filter film 205G, the blue filter film 205B, a red filter film 405R, a green filter film 405G, and a blue filter film 405B, in which all of the longitudinal columns of a matrix have the same color, as shown in FIG. 10(a) or 10(d). The red filter film 405R, the green filter film 405G, and the blue filter film 405B are filter films 405 in a filter layer 408. The red filter film 405R, the green filter film 405G, and the blue filter film 405B are filter films having a shape in which a portion is notched by forming a light-blocking section 404A for covering the portion in which the TFT elements 215 or the like on the red filter film 205R, the green filter film 205G, or the blue filter film 205B. The red filter film 405R, the green filter film 405G, and the blue filter film 405B are partitioned by a partition wall 404 and the light-blocking section 404A, and are formed by using the color materials to embed a filter film region 406 (see FIG. 15) arranged in the form of a dot matrix.

In a mosaic array, the filter film 205 or a filter film 415 is offset by a single color for each row in the lateral direction, as shown in FIG. 10(b) or 10(e). In the case of three colors, any three filter films 205 or filter film 415 rectilinearly aligned in the lateral and longitudinal directions are set in an array of three colors. A red filter film 415R, a green filter film 415G, and a blue filter film 405B are filter films 415 in a filter layer 418, and are octagonal planar-shaped filter films formed by chamfering the four corners of a substantially quadrangular shape. The red filter film 415R, the green filter film 415G, and the blue filter film 405B are partitioned by a partition wall 414, and are formed by using the color materials to embed a filter film region arranged in the form of a dot matrix.

A delta array is a color arrangement in which the arrangement of the filter film 205 or the filter film 425 is set in a stepped configuration and any three adjacent filter films 205 or filter films 425 differ in color in the case of a tri-color filter, as shown in FIG. 10(c) or 10(f). A red filter film 425R, a green filter film 425G, and a blue filter film 425B are filter films 425 in a filter layer 428, and are substantially hexagonal planar-shaped filter films. The red filter film 425R, the green filter film 425G, and the blue filter film 425B are partitioned by a partition wall 424, and are formed by using the color materials to embed a filter film region arranged in the form of a dot matrix.

In the three color filters shown in FIG. 10(*a*), (*b*), (*c*), (*d*), (*e*), or (*f*), the filter films 205, the filter films 405, the filter films 415, and the filter films 425 are formed by any single color material among R (red), G (green), and B (blue). A filter composed of picture elements (hereinafter referred to as "picture element filter 254"), which are the smallest units constituting an image, are formed in an assembly of filter films 205 that include one each of the red filter film 205R, the green filter film 205G, and the blue filter film 205B. Similarly, a picture element filter 454 is formed in an assembly of filter films 405 that include one each of the red filter film 405R, the green filter film 405G, and the blue filter film 405B. A picture element filter 464 is formed in an assembly of filter films 415 that include one each of the red filter film 415R, the green filter film 415G, and the blue filter film 415B. A picture element filter 474 is formed in an assembly of filter films 425 that include one each of the red filter film 425R, the green filter film 425G, and the blue filter film 425B.

A full color display is carried out by adjusting the luminous energy of light to be transmitted and by selectively transmitting light using one or any combination of a red filter film (the red filter film 205R), a green filter film (the green filter film 205G), and a blue filter film (the blue filter film 205B), in the picture element filter 254 or another single picture element filter.

Formation of Liquid Crystal Display Panel

Figure 11:
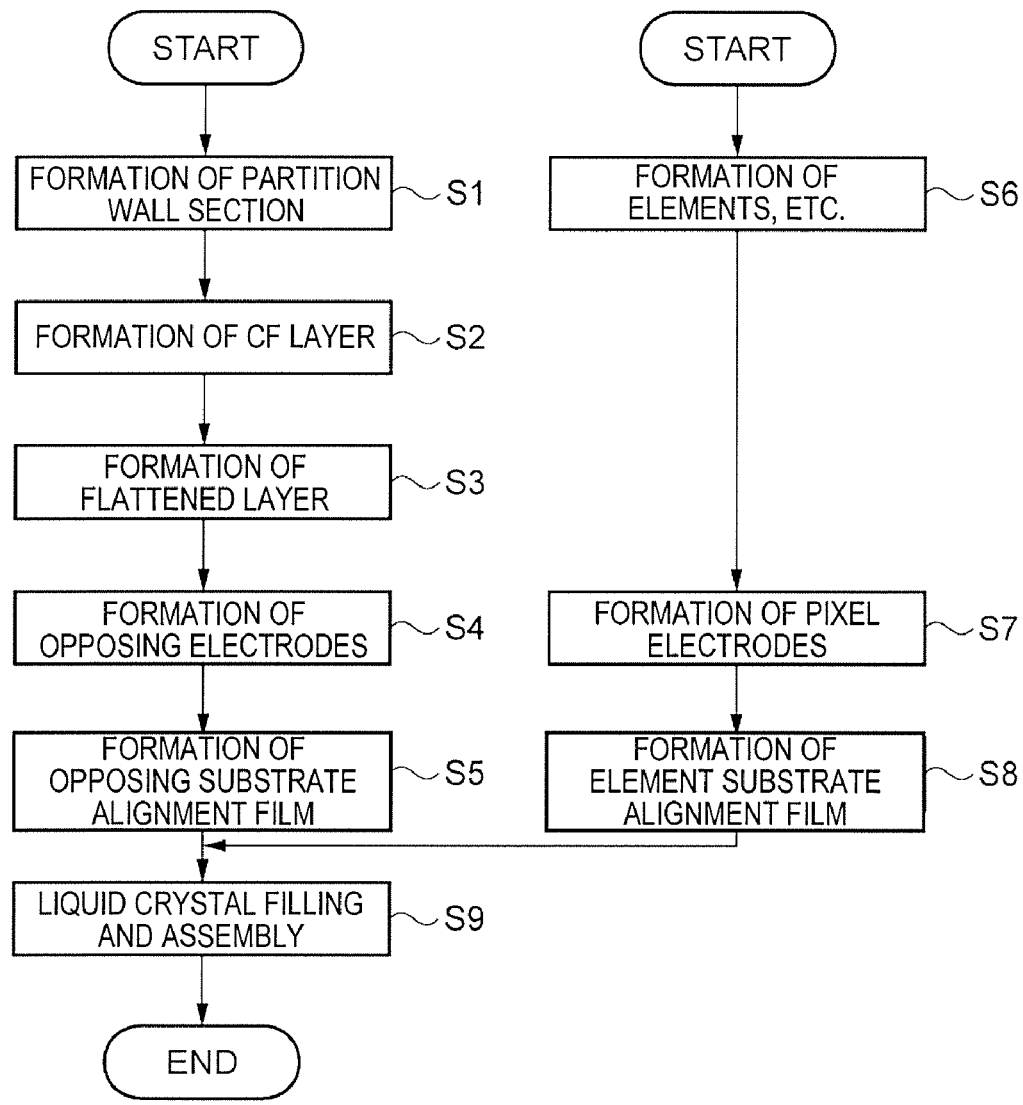
FIG. 11 is a flowchart that shows the process for forming a liquid crystal display panel.

The steps for forming the liquid crystal display panel 200 will be described next with reference to FIGS. 11, 12, and 13. FIG. 11 is a flowchart that shows the process for forming a liquid crystal display panel. FIG. 12 is a cross-sectional view showing the steps or the like for forming a filter film in the process for forming a liquid crystal display panel. FIG. 13 is a cross-sectional view showing the steps for forming an alignment film in the process for forming a liquid crystal display panel. The liquid crystal display panel 200 is formed by bonding together the element substrate 210 and the opposing substrate 220, which are separately formed.

The opposing substrate 220 is formed by carrying out steps S1 through S5 shown in FIG. 11.

In step S1, partition wall sections for partitioning and forming the filter film region 225 are formed on the glass substrate 201. The partition wall sections partition the black matrix 202 into a grid shape, and are formed by forming a bank 203 on the black matrix and arranging the partition wall 204 composed of the black matrix 202 and the bank 203 in a grid shape. The quadrangular filter film region 225 partitioned by the partition wall 204 is thereby formed on the surface of the glass substrate 201, as shown in FIG. 12(*a*).

Next, in step S2 of FIG. 11, the red filter film 205R, the green filter film 205G, and the blue filter film 205B are formed to obtain the CF layer 208. The red filter film 205R, the green filter film 205G, and the blue filter film 205B are formed by filling the filter film region 225 with functional liquid containing material that constitutes the red filter film 205R, the green filter film 205G, or the blue filter film 205B, and then drying the functional liquid.

More specifically, a red discharge head 17R is made to face the surface of the glass substrate 201 on which the filter film region 225 partitioned by the partition wall 204 is formed, as shown in FIG. 12(*b*). A red functional liquid 252R is deposited in a filter film region 225R by discharging the red functional liquid 252R from the discharge nozzles 78 of the red discharge head 17R toward the filter film region 225R in which the red filter film 205R is to be formed. At the same time, the red discharge head 17R is moved in a relative fashion with respect to the glass substrate 201 in the manner indicated by the arrow a, whereby the red functional liquid 252R is deposited in all the filter film regions 225R formed in the glass substrate 201. The red filter film 205R is formed in the filter film region 225R, as shown in FIG. 12(*c*), by drying the deposited red functional liquid 252R.

Similarly, green functional liquid 252G or blue functional liquid 252B are deposited in the filter film region 225G or the filter film region 225B in which the green filter film 205G or the blue filter film 205B shown in FIG. 12(*b*) are to be formed, as shown in FIG. 12(*c*). The green filter film 205G or the blue filter film 205B are formed in the filter film region 225G and the filter film region 225B, as shown in FIG. 12(*d*), by drying the green functional liquid 252G and the blue functional liquid 252B. In combination with the red filter film 205R, a tri-colored filter composed of the red filter film 205R, the green filter film 205G, and the blue filter film 205B is formed.

Next, a flattened layer is formed in the step S3 of FIG. 11. The flattened film 206 as the flattened layer is formed on the partition wall 204 as well as the red filter film 205R, the green filter film 205G, and the blue filter film 205B constituting the CF layer 208, as shown in FIG. 12(*e*). The flattened film 206 is formed in the region that covers at least the entire CF layer 208. The surface that forms the opposing electrodes 207 is made a substantially flat surface by providing the flattened film 206.

Next, the opposing electrodes 207 are formed in step S4 of FIG. 11. A thin film is formed using a transparent electroconductive material in the region on the flattened film 206 that covers the entire surface of the region in which at least the filter films 205 of the CF layer 208 are formed, as shown in FIG. 12(*f*). This thin film is the opposing electrodes 207 described above.

Next, the alignment film 228 of the opposing substrate 220 is formed on the opposing electrodes 207 in step S5 of FIG. 11. The alignment film 228 is formed in the region that covers at least the entire surface of the CF layer 208.

The droplet discharge head 17 is made to face the surface of the glass substrate 201 on which the opposing electrodes 207 are formed, as shown in FIG. 13(*g*), and an alignment film liquid 242 is discharged from the droplet discharge head 17 toward the surface of the glass substrate 201. At the same time, the discharge head 17 is moved in a relative fashion with respect to the glass substrate 201 in the manner indicated by the arrow a, whereby the alignment film liquid 242 is deposited over the entire surface of the region in which the alignment film 228 of the glass substrate 201 is to be formed. The alignment film 228 is formed by drying the deposited alignment film liquid 242, as shown in FIG. 13(*h*). The opposing substrate 220 is thus formed by carrying out step S5.

The element substrate 210 is formed by carrying out steps S6 to S8 shown in FIG. 11.

In step S6, the TFT elements 215 and other elements, the scan lines 212, the signal lines 214, and the insulating layer 216 and the like are formed by forming an electroconductive layer, an insulating layer, and semiconductor layer on the glass substrate 211. The scan lines 212 and the signal lines 214 are formed in positions facing the partition wall 204, i.e., in positions at the periphery of the pixels in a state in which the element substrate 210 and the opposing substrate 220 have been bonded together. The TFT elements 215 are formed so as to be positioned at the edge of the pixels, and at least one TFT element 215 is formed on a single pixel.

The pixel electrodes 217 are formed next in step S7. The pixel electrodes 217 are formed in positions facing the red filter film 205R, the green filter film 205G, and the blue filter film 205B in a state in which the element substrate 210 and the opposing substrate 220 have been bonded together. The pixel electrodes 217 are electrically connected to the drain electrodes of the TFT elements 215.

Next, in step S8, the alignment film 218 of the element substrate 210 is formed on the pixel electrodes 217 or the like. The alignment film 218 is formed in at least a region that covers the entire surface of the all the pixel electrodes 217

The droplet discharge head 17 is made to face the surface of the glass substrate 211 on which the pixel electrodes 217 are formed, and the alignment film liquid 242 is discharged from the droplet discharge head 17 toward the surface of the glass substrate 211, as shown in FIG. 13(i). At the same time, the discharge head 17 is moved in a relative fashion with respect to the glass substrate 211 in the manner indicated by the arrow a, whereby the alignment film liquid 242 is deposited over the entire surface of the region in which the alignment film 218 of the glass substrate 211 is to be formed. The alignment film 218 is formed by drying the deposited alignment film liquid 242, as shown in FIG. 13(j). The opposing substrate 210 is thus formed by carrying out step S8.

Next, in step S9 shown in FIG. 11, the opposing substrate 220 and the element substrate 210 thus formed are bonded together and the liquid crystal 230 is filled therebetween, as shown in FIG. 13(k). A polarizing plate 231 and a polarizing plate 232 are furthermore bonded or otherwise affixed to complete the assembly of the liquid crystal display panel 200. A mother substrate on which a plurality of liquid crystal display panels 200 is formed is divided into individual liquid crystal display panels 200 in the case that a plurality of opposing substrates 220 and element substrates 210 are formed on the mother substrate composed of a plurality of glass substrates 201 and glass substrates 211. Alternatively, step S9 is carried out after the step for dividing the mother opposing substrate 201A and the mother element substrate into the opposing substrates 220 and the element substrates 210. Step S9 is carried out and the step for forming the liquid crystal display panel 200 is ended.

Functional Liquid Arrangement

Figure 14:
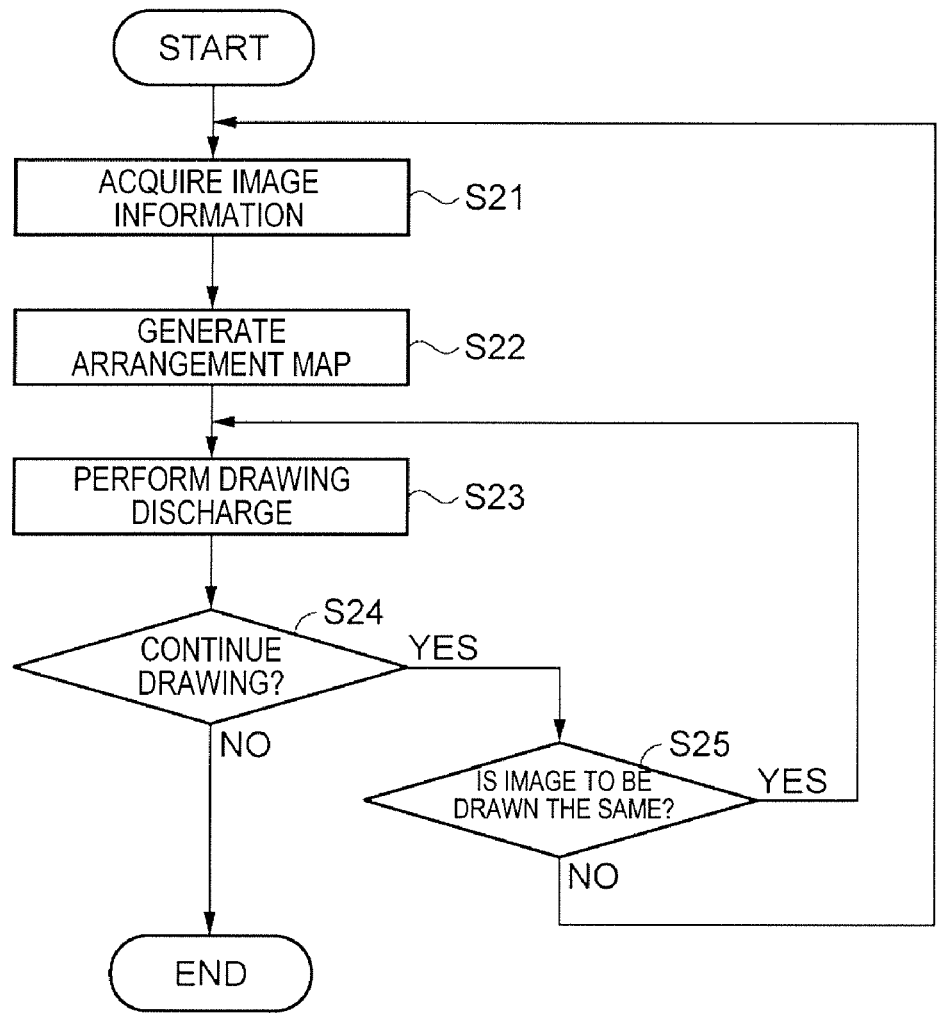
FIG. 14 is a flowchart showing the steps for depositing functional liquid.
Figure 15:
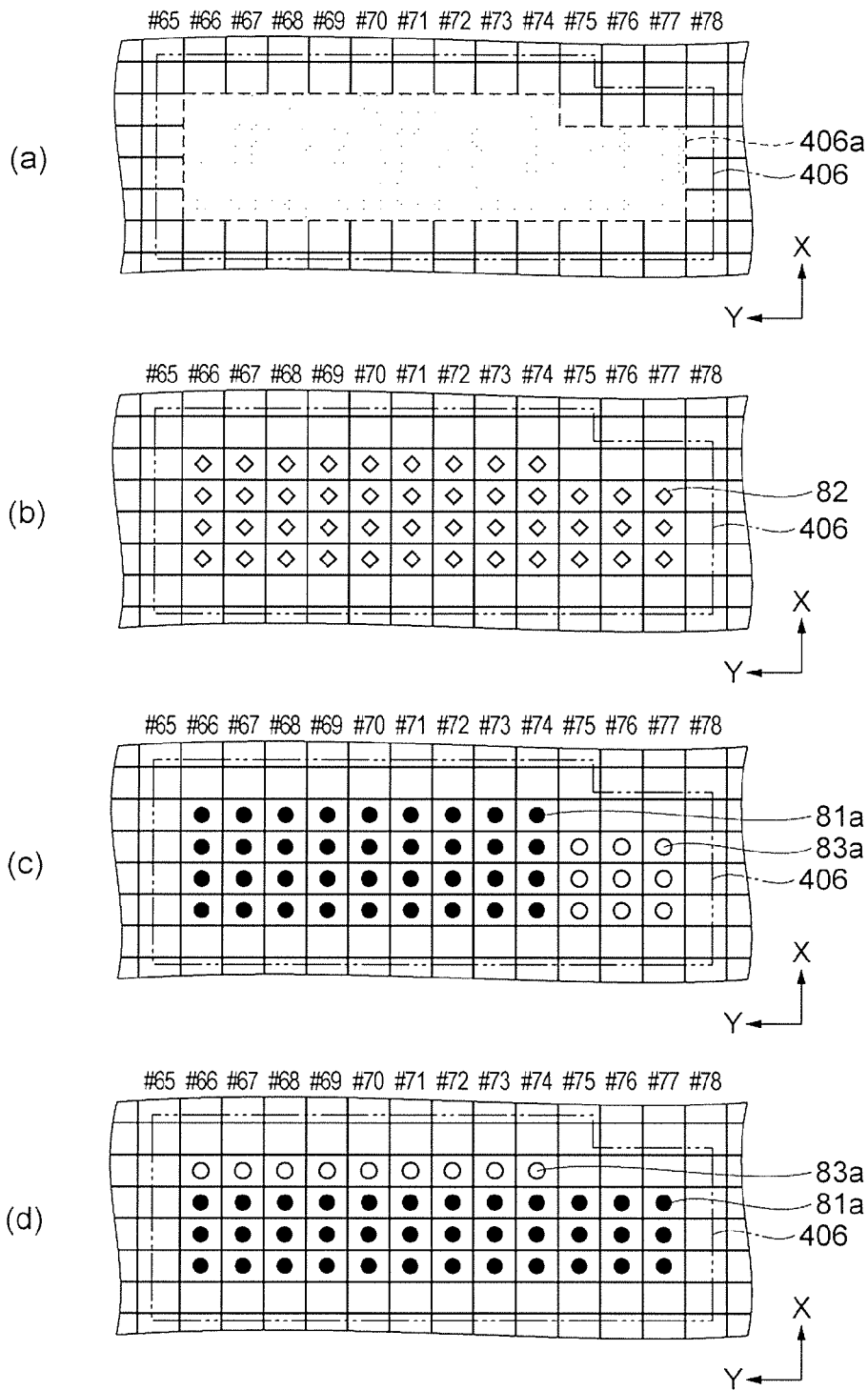
FIG. 15 is a descriptive view showing the relationship between the filter film region, the discharge nozzles, the possible landing positions, and the arrangement map.

Described next with reference to FIGS. 14 and 15 is the step for discharging functional liquid from the droplet discharge head 17 of the droplet discharge device 1 and depositing the functional liquid in the filter film region 225 and other filter films of the CF layer in the mother opposing substrate. FIG. 14 is a flowchart showing the steps for depositing functional liquid. FIG. 15 is a descriptive view showing the relationship between the filter film region, the discharge nozzles, the possible landing positions, and the arrangement map. The X-axis and Y-axis shown in FIG. 15 match the X-axis and Y-axis shown in FIG. 1 in a state in which the head unit 21 is mounted on the droplet discharge device 1.

In step S21 of FIG. 14, the drawing image information of an image to be drawn by depositing functional liquid is acquired. For example, the shape and arrangement position of the filter film region 406, which is the region in which the filter films 405 described above is formed on the mother opposing substrate, is acquired. FIG. 15(a) is a descriptive view showing the relationship between the filter film region and the discharge nozzles.

The landing point region 406a shown in FIG. 15(a) is a region in which the positions of the landing points 81 are set when the droplets of the functional liquid are to be made to land in order to fill the functional liquid into the filter film region 406. Generally, a machine cannot perfectly repeat an identical operation, and an identical operation can only be repeated with variation within a fixed range. The landing point region 406a is set to be smaller than the filter film region 406 with consideration given to the size of the droplets of the functional liquid and the landing position variability (hereinafter, the range of variability will be referred to as "specific landing position accuracy") that cannot be perfectly eliminated, even if the droplet discharge device 1 functions normally. The positions of the landing points 81 are set inside the landing point region 406a, whereby the landing point region 406a becomes a region in which the droplets are not displaced from the filter film region 406 even when the actual position of the landing points 81 are outside of the range of the specific landing position accuracy. The landing point region 406a corresponds to a target discharge partitioned area.

The grid cells shown in FIG. 15 have a configuration in which the X-axis direction of the grid cells is the minimum landing distance d, the Y-axis direction of the grid cells is ½ the nozzle pitch, and a single landing point 81 corresponds to single grid cell. The numbers #65 to #78 indicate the numbers assigned to the discharge nozzles 78. As described above, the droplet discharge head 17 is provided with two nozzle rows 78A, and the odd-numbered discharge nozzles 78 and the even-numbered discharge nozzles 78 each constitute different nozzle rows 78A. Therefore, when liquid is made to land in the same position in the X-axis direction, the discharge time point is necessarily different for the odd-numbered discharge nozzles 78 and even-numbered discharge nozzles 78, and in the following description, the discharge nozzles 78 will be described as being arranged in a single row in order to avoid laborious description of each of the nozzle rows 78A.

FIG. 15(b) is a descriptive view showing the possible landing positions that correspond to the landing point region. The possible landing points 82 shown in the FIG. 15(b) indicate the positions that can be set as landing points 81 when droplets of the functional liquid are made to land in the landing point region 406a using the droplet discharge device 1. The discharge nozzles 78 specified by the numbers #66 to #77, and the possible landing points 82 arrayed in the X-axis direction and in the same position in the Y-axis direction indicate the positions in which droplets discharged from the discharge nozzles 78 can be deposited. The droplets are discharged at the same time point from the discharge nozzles 78 and can thereby be made to land in the possible landing points 82 arranged in the Y-axis direction and located in the same position in the X-axis direction.

There are 45 possible landing points 82 in which functional liquid can be deposited in the landing point region 406a during a single cycle of relative movement of the droplet discharge head 17 with respect to the filter film region 406 using the droplet discharge device 1, as shown in FIG. 15(b). The possible landing points 82 aligned in the Y-axis direction indicate positions in which droplets discharged from the plurality of discharge nozzles 78 at the same discharge timing can be deposited. In the case that the filter film region is not quadrangular, the number of possible landing points 82 aligned in the X-axis direction will fluctuate at each discharge timing, as shown in FIG. 15(b). Having a shape other than a quadrangular means a shape in which the width in the Y-axis direction varies, and includes shapes having a number of corners other than four, circular and elliptical shapes, as well as partially arcuate shapes.

Next, an arrangement map is generated based on drawing image information in step S22 of FIG. 14. FIG. 15(c) is a descriptive view showing the relationship between the filter film region and the arrangement map. The deposit points 81a shown in FIG. 15(c) indicate positions selected as positions in which droplets are to be deposited among the possible landing points 82 shown in FIG. 15(b). The arrangement map in which the functional liquid is to be made to land on the deposit points 81a shown in FIG. 15(c) has a configuration in which the functional liquid is deposited in a single filter film region 406 by carrying out four discharge cycles from the discharge nozzles 78 numbered #66 to #74.

Non-deposition points 83a indicated by white circles in FIG. 15(c) show positions that have not been selected as positions in which droplets will be deposited among the possible landing points 82 shown in FIG. 15(b). The discharge nozzles 78 numbered #75, #76, and #77 can deposit droplets of the functional liquid in the landing point region 406a, but the arrangement map used for carrying out discharges toward the deposit points 81a shown in FIG. 15(c) in the landing point region 406a is configured so that the discharge nozzles 78 numbered #75, #76, and #77 are not allowed to carry out a discharge.

The discharge nozzles 78 numbered #75, #76, and #77 are made to perform only three deposition cycles in a single landing point region 406a during a single cycle of relative movement of the droplet discharge head 17 with respect to the filter film region 406. Accordingly, when the discharge nozzles 78 numbered #75, #76, and #77 are made to perform a discharge in the landing point region 406a, the nine discharge nozzles 78 numbered #66 through #74 may discharge at substantially the same time or the 12 discharge nozzles 78 numbered #66 through #77 may discharge at substantially the same time.

The configuration causes discharge nozzles 78 to perform four discharge cycles and to deposit droplets of functional liquid in the landing point region 406a using the discharge nozzles 78 numbered #66 to #74, which carry out four deposition cycles in a single landing point region 406a during a single relative movement cycle. The number of discharge nozzles 78 that are to carry out a discharge at substantially the same time is constant when a discharge is made toward the landing point region 406a.

FIG. 15(d) is a descriptive view showing the relationship between the filter film region and the arrangement map. FIG. 15(d) shows an example of an arrangement map that is different from the example of the arrangement map shown in FIG. 15(c). The arrangement map used for causing functional liquid to land in the deposit points 81a shown in FIG. 15(d) is configured so that the discharge nozzles 78 numbered #66 to #77 perform three discharge cycles and deposit functional liquid in a single filter film region 406.

The discharge nozzles 78 numbered #66 to #74 deposit liquid in the landing point region 406a in four cycles during a single relative movement cycle, but the configuration is such that a discharge for causing droplets to land in the non-deposition points 83a shown in FIG. 15(d) is not carried out, and three discharge cycles toward a single landing point region 406a are therefore carried out. In conjunction with three discharge time points in which the discharge nozzles 78 numbered #75, #76, and #77 can be made to deposit droplets of functional liquid in the landing point region 406a, the discharge nozzles 78 numbered #66 to #74 can also be made to carry out three discharge cycles, whereby the number of discharge nozzles 78 for carrying out a discharge toward the landing point region 406a is a constant 12 nozzles.

The number of discharge nozzles 78 for carrying out a discharge at substantially the same time is constant when a discharge is made toward the landing point region 406a for the case in which the discharge nozzles 78 carry out (depositing droplets of the functional liquid) four discharge cycles in a single landing point region 406a using the discharge nozzles 78 numbered #66 to #74, as well as for the case in which the discharge nozzles 78 carry out three discharge cycles in a single landing point region 406a using the discharge nozzles 78 numbered #66 to #77. Accordingly, the number of discharge nozzles 78 for carrying out a discharge at substantially the same time is different, whereby fluctuations in the discharge amount can be reduced.

The number of discharges toward a single landing point region 406a is a constant three or four cycles during a single cycle of relative movement of the discharge nozzles 78 that are used to carry out discharges. The operating state of the discharge nozzles 78 at this time is an orderly state in which discharge is not carried out on the partition walls and other portions, and an operating state in which three or four discharges are repeated toward the landing point region 406a. On the other hand, the operating state of the discharge nozzles 78 is an operating state that differs depending on which positions the droplets are deposited in the landing point region 406a in the case that the number of discharge cycles is different for each discharge nozzle 78, resulting in a state in which there are discharge nozzles 78 in various mutually different operating states. Therefore, the number of cycles of discharge toward a single landing point region 406a can be made constant during a single cycle of relative movement of the discharge nozzles 78. Therefore, the operating states of the discharge nozzles 78 are different, and fluctuations in the discharge amount can be reduced in comparison with the case in which the number of discharge cycles of the discharge nozzles 78 is different.

The number of droplets that land in the landing point region 406a is the same for the case in which the discharge nozzles 78 carry out four discharge cycles to deposit droplets of functional liquid in the landing point region 406a using the discharge nozzles 78 numbered #66 to #74, as well as for the case in which the discharge nozzles 78 carry out three discharge cycles to deposit droplets of functional liquid in the landing point region 406a using the discharge nozzles 78 numbered #66 to #77. The discharge amount per single droplet can be adjusted to a suitable amount by adjusting the drive voltage described with reference to FIGS. 6A and 6B in order to fill a required yet sufficient amount of functional liquid into the filter film region 406 when the stated number of droplets has been deposited.

Next, in step S23 of FIG. 14, discharges for drawing are carried out based on the arrangement map generated in step S22. When discharges for drawing are carried out based on the arrangement map shown in FIG. 15(c) or 15(d), the landing points 81 that match the deposit points 81a in the range of the landing point region 406a in a specific landing position accuracy range are kept within the range of the filter film region 406. The droplets of functional liquid that have landed in the deposit points 81a shown in FIG. 15(c) or 15(d) wet and spread, whereby the functional liquid is deposited over the entire surface of the filter film region 406. The film-like filter films 405 that cover the entire surface of the filter film region 406 shown in FIG. 15(a) are formed by drying the functional liquid.

Following step S23, another mother opposing substrate or the like is used as a target for the drawing discharges and a determination is made in step S24 as to whether the drawing discharges will be continued further. The process proceeds to step S25 in the case that drawing discharges are to be continued (Yes in step S24).

In step S25, it is determined whether the drawing image as the target for carrying out the drawing discharge is the same drawing image of the image information acquired in step S21.

Next, in the case that the drawing image used for carrying out the drawing discharge is the same image (Yes in step S25), the process subsequently proceeds from step S25 to step S23 and steps S23 and S24 are repeated. In the case that the drawing image used for carrying out the drawing discharge is different (No in step S25), the process subsequently proceeds from step S25 to step S21 and steps S21 to S24 are repeated.

Step S24 is ended when the drawing discharge will not be continued (No in step S24). The functional liquid is discharged from the droplet discharge head 17 of the droplet discharge device 1 and the step for depositing functional liquid in the filter film region 406 or the like on the mother opposing substrate is ended.

First Example of Arrangement Map Corresponding to Filter Film Region

Figure 16:
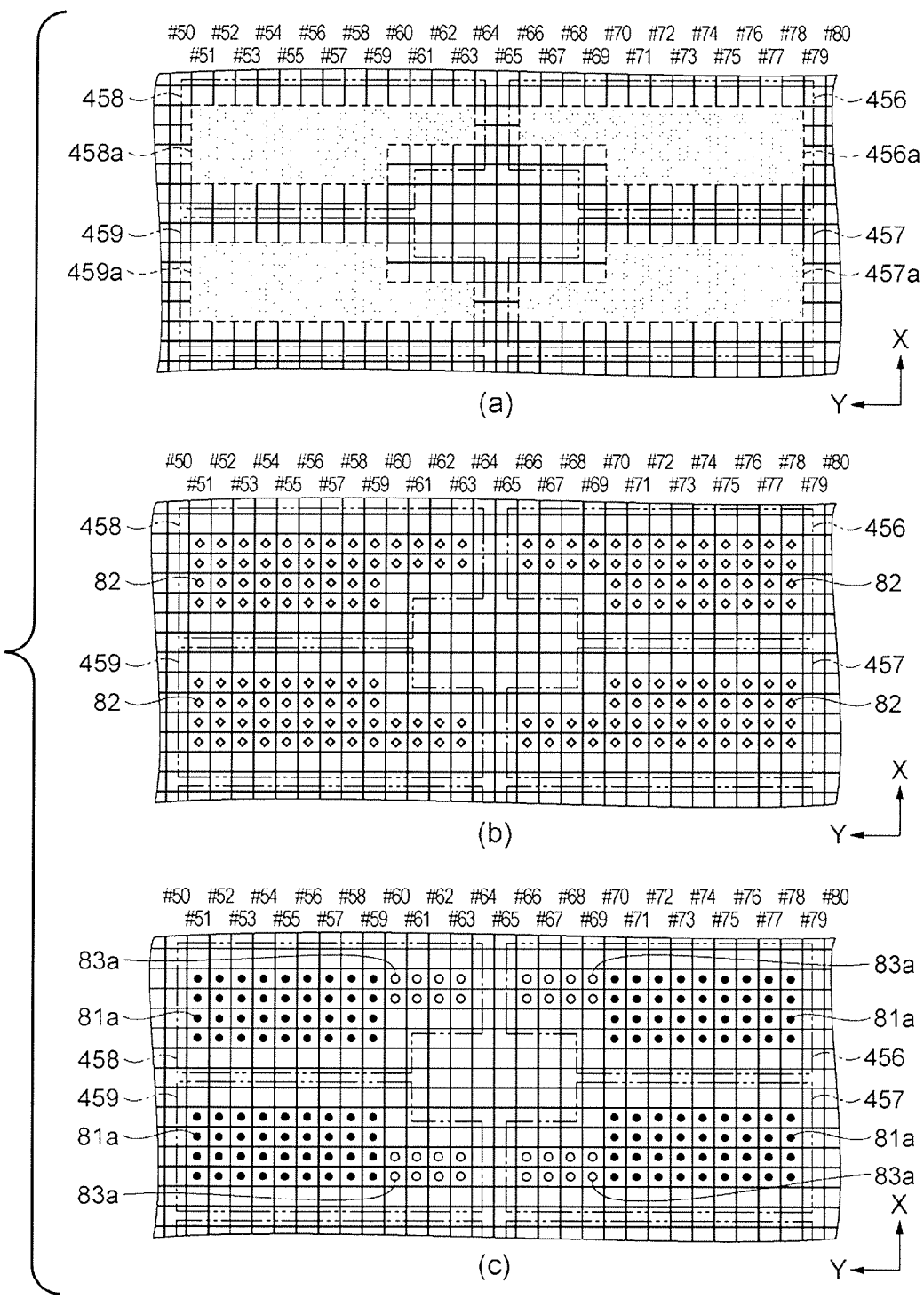
FIG. 16 is a descriptive view showing the relationship between the filter film region, the discharge nozzles, the possible landing positions, and the arrangement map.

Described next with reference to FIG. 16 is an example of an arrangement map that corresponds to a filter film region having a different shape than the filter film region described above. FIG. 16 is a descriptive view showing the relationship between the filter film region, the discharge nozzles, the possible landing positions, and the arrangement map. The X-axis and Y-axis shown in FIG. 16 match the X-axis and Y-axis shown in FIG. 1 in a state in which the head unit 21 is mounted on the droplet discharge device 1.

FIG. 16(a) is a descriptive view showing the relationship between the shape of the filter film region and the discharge nozzles. A landing point region 456a, a landing point region 457a, a landing point region 458a, and a landing point region 459a shown in FIG. 16(a) are regions in which the positions of the landing points 81 are set when droplets of the functional liquid are to be deposited in order to fill functional liquid into the filter film region 456, the filter film region 457, the filter film region 458, or the filter film region 459. The landing point region 456a, the landing point region 457a, the landing point region 458a, and the landing point region 459a are set to be smaller in size than the filter film region 456, the filter film region 457, the filter film region 458, or the filter film region 459 with consideration given to the size of the droplets of functional liquid and the specific landing position accuracy described above.

The filter film region 456, the filter film region 457, the filter film region 458, and the filter film region 459 are regions for forming filter films in partially notched shapes by forming a light-blocking section for covering the portion in which the drive elements or the like for driving the pixels are formed.

The grid cells shown in FIG. 16 have a configuration in which the X-axis direction of the grid cells is the minimum landing distance d, the Y-axis direction of the grid cells is ½ the nozzle pitch, and a single landing point 81 corresponds to single grid cell. The numbers #50 to #80 indicate the numbers assigned to the discharge nozzles 78.

FIG. 16(b) is a descriptive view showing the possible landing points that correspond to the landing point region. The possible landing points 82 shown in FIG. 16(b) indicate positions that can be set as landing points 81 when droplets of the functional liquid are made to land in the landing point region 456a, the landing point region 457a, the landing point region 458a, and the landing point region 459a using the droplet discharge device 1. The discharge nozzles 78 specified by the numbers #50 to #80, and the possible landing points 82 arranged in the X-axis direction and in the same position in the Y-axis direction indicate the positions in which droplets discharged from the discharge nozzles 78 can be deposited. There are 44 possible landing points 82 in which functional liquid can be deposited in the landing point region 456a, the landing point region 457a, the landing point region 458a, or the landing point region 459a during a single cycle of relative movement of the droplet discharge head 17 with respect to the filter film region 406 using the droplet discharge device 1, as shown in FIG. 16(b). The landing point region 456a, the landing point region 457a, the landing point region 458a, and the landing point region 459a correspond to the target discharge partitioned areas.

FIG. 16(c) is a descriptive view showing the relationship between the filter film region and the arrangement map. The deposit points 81a shown in FIG. 16(c) indicate positions selected as positions in which droplets are to be deposited among the possible landing points 82 shown in FIG. 16(b). The arrangement map in which the functional liquid is to be made to land on the deposit points 81a shown in FIG. 16(c) has a configuration in which the functional liquid is deposited in a single filter film region 456, the filter film region 457, the filter film region 458, or the filter film region 459 by carrying out four discharge cycles from the discharge nozzles 78 numbered #51 to #59 and #70 to #78.

Non-deposition points 83a indicated by white circles in FIG. 16(c) show positions that have not been selected as positions in which droplets will be deposited among the possible landing points 82 shown in FIG. 16(b). The discharge nozzles 78 numbered #60 to #63 and #66 to #69 can deposit droplets of the functional liquid in the landing point region 456a, the landing point region 457a, the landing point region 458a, or the landing point region 459a. However, the arrangement map used for carrying out discharges toward the deposit points 81a shown in FIG. 16(c) in the landing point region 456a, the landing point region 457a, the landing point region 458a, or the landing point region 459a is configured so that the discharge nozzles 78 numbered #60 to #63 and #66 to #69 are not allowed to carry out a discharge.

The discharge nozzles 78 numbered #60 to #63 and #66 to #69 are made to perform only two deposition cycles in the landing point region 456a, the landing point region 457a, the landing point region 458a, or the landing point region 459a during a single cycle of relative movement of the droplet discharge head 17 with respect to the filter film region 456 or the like. Accordingly, when the discharge nozzles 78 numbered #60 to #63 and #66 to #69 are made to perform a discharge in the landing point region 456a, the landing point region 457a, the landing point region 458a, or the landing point region 459a, the 18 discharge nozzles 78 numbered #51 through #59 and #70 through #78 may discharge at substantially the same time or the 26 discharge nozzles 78 numbered #51 through #63 and #66 through #78 may discharge at substantially the same time.

In the arrangement map shown in FIG. 16(c), the configuration causes discharge nozzles 78 to perform four discharge cycles and to deposit droplets of functional liquid in the landing point region 456a, the landing point region 457a, the landing point region 458a, or the landing point region 459a using the discharge nozzles 78 numbered #51 to #59 and #70 to #78, which carry out four deposition cycles in the landing point region 456a, the landing point region 457a, the landing point region 458a, or the landing point region 459a during a single relative movement cycle. The number of discharge nozzles 78 that are to carry out a discharge at substantially the same time is thereby made constant when a discharge is made toward in the landing point region 456a, the landing point region 457a, the landing point region 458a, and the landing point region 459a.

Filter films of the same color are not adjacently disposed in the X-axis direction and the Y-axis direction in a tri-color filter or another multicolored filter as described with reference to FIG. 10. However, in FIG. 16, the arrangement map for depositing the same functional liquid in adjacent filter film regions is shown with the spacing omitted.

Second Example of Arrangement Map
Corresponding to Filter Film Region

Described next with reference to FIG. 17 is an example of an arrangement map that corresponds to a filter film region having a shape different from the filter film region described above. FIG. 17 is a descriptive view showing the relationship between landing point region, the possible landing positions, and the arrangement map. The X-axis and Y-axis shown in FIG. 16 match the X-axis and Y-axis shown in FIG. 1 in a state in which the head unit 21 is mounted on the droplet discharge device 1. Therefore, the X-axis direction is the main scanning direction and the Y-axis direction is the array direction of the discharge nozzles 78.

FIG. 17(a) is a descriptive view showing the relationship between the landing point region and the possible landing points. A landing point region 416a shown in FIG. 17(a) is a region in which the positions of the landing points 81 are set when droplets of the functional liquid are to be deposited in order to fill functional liquid into the filter film region 416 for forming the filter films 415 described above.

As described above, droplets can be made to land in the possible landing points 82 arrayed in the X-axis direction and in the same position in the Y-axis direction by discharging the droplets from the same discharge nozzles 78.

There are 84 possible landing points 82 present in the landing point region 416a. The landing point region 416a corresponds to a target discharge partitioned area.

FIG. 17(b) is a descriptive view showing the relationship between the landing point region and the arrangement map. The deposit points 81a shown in FIG. 17(b) indicate positions selected as positions in which droplets are to be deposited among the possible landing points 82 shown in FIG. 17(a). There are 64 deposition points 81a set in the arrangement map shown in FIG. 17(b). The arrangement map shown in FIG. 17(b) is configured so that the number of deposit points 81a is maximal under conditions in which the number of discharge cycles of the discharge nozzles 78 is the same and the discharges are carried out at substantially the same time toward the landing point region 416a. Increasing the number of deposit points 81a makes it possible to increase the adjustable range of the deposit amounts for the case in which the amount of functional liquid to be deposited in the filter film region 416 is adjusted by adjusting the size of the droplets.

FIG. 17(c) is a descriptive view showing the relationship between the landing point region and the arrangement map. The deposit points 81a shown in FIG. 17(c) indicate positions selected as positions in which droplets are to be deposited among the possible landing points 82 shown in FIG. 17(a). There are 48 deposition points 81a set in the arrangement map shown in FIG. 17(c). The arrangement map shown in FIG. 17(c) is configured so that 48 possible landing points 82 are selected as deposit points 81a, and the number of discharge nozzles 78 for performing discharges is maximal under conditions in which the number of discharge cycles of the discharge nozzles 78 is the same and the discharges are carried out at substantially the same time toward the landing point region 416a.

The amount of discharge from the discharge nozzles 78 varies within a specified range and varies slightly for each discharge nozzle 78. The use of a large number of discharge nozzles 78 makes it possible to reduce the effect that the variability in the discharge amounts of the discharge nozzles has on the amount of functional liquid that is deposited in the filter film regions 416.

FIG. 17(d) is a descriptive view showing the relationship between the landing point region and the arrangement map. The deposit points 81a shown in FIG. 17(d) indicate positions selected as positions in which droplets are to be deposited among the possible landing points 82 shown in FIG. 17(a). There are 48 deposition points 81a set in the arrangement map shown in FIG. 17(d) in the same manner as the arrangement map shown in FIG. 17(c). The arrangement map shown in FIG. 17(d) is configured so that 48 possible landing points 82 are selected as deposit points 81a, and the number of discharge nozzles 78 for performing discharges is minimal under conditions in which the number of discharge cycles consecutively performed by the discharge nozzles 78 is the same and the discharges are carried out at substantially the same time toward the landing point region 416a.

There is a high possibility that the peripheral conditions are substantially the same between proximally formed discharge nozzles, and variation in the amount of discharge from the discharge nozzles 78 in the droplet discharge head 17 is unlikely to occur. The possibility that proximally formed discharge nozzles will be used is increased by reducing the number of discharge nozzles 78 to be used. Since the possibility that variability in the discharge amount of the discharge nozzles 78 to be used will thereby be reduced, variability in the amount of functional liquid deposited in the filter film regions 416 can be reduced.

FIG. 17(e) is a descriptive view showing the relationship between the landing point region and the arrangement map. The deposit points 81a shown in FIG. 17(e) indicate positions selected as positions in which droplets are to be deposited among the possible landing points 82 shown in FIG. 17(a). There are 48 deposition points 81a set in the arrangement map shown in FIG. 17(d) in the same manner as the arrangement map shown in FIG. 17(c) or 17(d). The arrangement map shown in FIG. 17(e) is configured so that 48 possible landing points 82 are selected as deposit points 81a, and the number of discharge nozzles 78 for performing discharges is minimal under conditions in which the number of discharge cycles performed by the discharge nozzles 78 is the same and the discharges are carried out at substantially the same time toward the landing point region 416a. The arrangement map shown in FIG. 17(e) is configured so as to obtain a maximum surface area of the range enclosed by a line that connects the deposit points 81a positioned at the outermost periphery of the region in which the deposit points 81a are positioned, under conditions in which the number of discharge cycles consecutively performed by the discharge nozzles 78 is the same and the discharges are carried out at substantially the same time.

Therefore, the region in which the droplets of functional liquid are deposited is the maximum, and the size of the region in which the functional liquid is deposited in the filter film region 416 is the maximum. It is therefore possible to facilitate the wetting and spreading of the deposited functional liquid over the entire surface of the filter film region 416.

FIG. 17(f) is a descriptive view showing the relationship between the landing point region and the arrangement map. The deposit points 81a shown in FIG. 17(f) indicate positions selected as positions in which droplets are to be deposited among the possible landing points 82 shown in FIG. 17(a). There are 48 deposition points 81a set in the arrangement map shown in FIG. 17(f) in the same manner as the arrangement map shown in FIG. 17(c), 17(d), or 17(e). The arrangement map shown in FIG. 17(f) is configured so that 48 possible landing points 82 are selected as deposit points 81a, and so as to obtain a minimum surface area of the range enclosed by a line that connects the deposit points 81a positioned at the outermost periphery of the region in which the deposit points 81a are positioned, under conditions in which the number of discharge cycles consecutively performed by the discharge nozzles 78 is the same and the discharges are carried out at substantially the same time.

Therefore, the region in which the droplets of functional liquid are deposited is the minimum, and the size of the region in which the functional liquid is deposited in the filter film region 416 is the minimum. Therefore, the distance between the deposit points 81a and the partition wall for forming the filter film region 416 can be maximized in terms of average distance. The possibility that the functional liquid will land in a position displaced from the deposit points 81a can be reduced when the functional liquid is deposited.

FIG. 17(g) is a descriptive view showing the relationship between the landing point region and the arrangement map. The deposit points 81a shown in FIG. 17(g) indicate positions selected as positions in which droplets are to be deposited among the possible landing points 82 shown in FIG. 17(a). There are 48 deposition points 81a set in the arrangement map shown in FIG. 17(g) in the same manner as the arrangement maps shown in FIGS. 17(c) through 17(f). The arrangement map shown in FIG. 17(g) is configured so that 48 possible landing points 82 are selected as deposit points 81a, and so as to obtain a maximum surface area of the range enclosed by a line that connects the deposit points 81a positioned at the outermost periphery of the region in which the deposit points 81a are positioned, under conditions in which the number of discharge nozzles 78 for carrying out discharge at substantially the same time is the same.

Therefore, the region in which the droplets of functional liquid are deposited is the maximum, and the size of the region in which the functional liquid is deposited in the filter film region 416 is the maximum. It is therefore possible to facilitate the wetting and spreading of the deposited functional liquid over the entire surface of the filter film region 416. This situation is different in that the number of discharges carried out by the discharge nozzles 78 toward the filter film region 416 is not the same as the arrangement example shown in FIG. 17(e), and the region in which the droplets of functional liquid are deposited is greater.

FIG. 17(h) is a descriptive view showing the relationship between the landing point region and the arrangement map. The deposit points 81a shown in FIG. 17(h) indicate positions selected as positions in which droplets are to be deposited among the possible landing points 82 shown in FIG. 17(a). There are 48 deposition points 81a set in the arrangement map shown in FIG. 17(h) in the same manner as the arrangement maps shown in FIGS. 17(c) through 17(g). The arrangement map shown in FIG. 17(h) is configured so that 48 possible landing points 82 are selected as deposit points 81a, and so as to obtain a maximum surface area of the range enclosed by a line that connects the deposit points 81a positioned at the outermost periphery of the region in which the deposit points 81a are positioned, under conditions in which the number of discharge nozzles 78 for carrying out discharges at substantially the same time is the same and the number of discharge cycles of the discharge nozzles 78 is the same.

Therefore, the region in which the droplets of functional liquid are deposited is the maximum, and the size of the region in which the functional liquid is deposited in the filter film region 416 is the maximum. It is therefore possible to facilitate the wetting and spreading of the deposited functional liquid over the entire surface of the filter film region 416. This situation is different in that the discharges carried out by the discharge nozzles 78 toward the filter film region 416 are not consecutive in comparison with the arrangement example shown in FIG. 17(e), and the region in which the droplets of functional liquid are deposited is greater.

Preferred embodiments were described above with reference to the attached drawings, but the preferred embodiments are not limited to the embodiments described above. It is apparent that various modifications can be in a range that does not depart from the spirit of the present invention, and the embodiments can be modified in the manners described below.

MODIFIED EXAMPLE 1

In the embodiments described above, the number of scans for depositing sufficient functional liquid in the filter film region 406 or the like is not specified, but a single scan or a plurality of scans may be performed. The arrangement map of droplets to be discharged in a scan carried out a plurality of times may be different for each scan. For example, in the first scan, discharges may be carried out in accordance with the arrangement map shown in FIG. 15(c) described in the embodiments, and in the second scan, the discharges may be carried out in accordance with the arrangement map shown in FIG. 15(d), whereby the functional liquid can be deposited in a more uniform manner in the filter film region 456 or another partition.

MODIFIED EXAMPLE 2

In the embodiments described above, the number of discharge nozzles 78 that discharge at the same time is constant in each filter film region 406 or other film formation region. However, the number of discharge nozzles that discharge at the same time in all the film formation regions is not required to be uniform. For example, a configuration is also possible in which the constant number is different for each film formation region in the main scanning direction.

MODIFIED EXAMPLE 3

In the embodiments described above, the number of discharge nozzles 78 that discharge at the same time is constant in each filter film region 406 or other film formation region. However, the number of discharge nozzles that discharge at the same time in individual film formation regions is not required to be constant. A configuration is also possible in which the number of discharge nozzles that discharge at the same time is constant in a plurality of film formation regions in the array direction of the discharge nozzles.

MODIFIED EXAMPLE 4

In the embodiments described above, the droplet discharge head 17 is provided with two nozzle rows 78A and has a configuration having 180 discharge nozzles 78 in each nozzle row 78A. However, the configuration of the discharge nozzles in the droplet discharge head is not limited to a configuration such as that in droplet discharge head 17. The droplet discharge head may have any number of discharge nozzles, and the discharge nozzles in the droplet discharge head may be, e.g., in a single-row or any other arrangement.

MODIFIED EXAMPLE 5

In the embodiments described above, the droplet discharge device 1 is provided with a Y-axis table 12 for moving the head unit 21 of the droplet discharge head 17 in the sub scanning direction. However, it is not required that the droplet discharge head be moved in the sub scanning direction. The droplet discharge device may have a configuration provided with a row of discharge nozzles capable of discharging over the entire width of the discharge target.

MODIFIED EXAMPLE 6

In the embodiments described above, the head unit 21 of the droplet discharge device 1 is provided with six droplet discharge heads 17, but the number of droplet discharge heads provided to the head unit is not limited to six. The head unit has a configuration provided with any number of droplet discharge heads.

MODIFIED EXAMPLE 7

In the embodiments described above, the droplet discharge device 1 is provided with a single set of head units 21, but the head units provided to the droplet discharge device are not limited to a single set. The droplet discharge device may have a configuration provided with any number of sets of head units.

MODIFIED EXAMPLE 8

In the embodiments described above, the droplet discharge head 17 is an inkjet-type droplet discharge head, but the droplet discharge head is not required to be an inkjet-type droplet discharge head. The discharge head, in which the array method of the deposit points described above is applied, may be a droplet discharge head of a method other than the inkjet method.

MODIFIED EXAMPLE 9

In the embodiments described above, the drawing discharges were described for the case in which the filter films 205 or the like of the liquid crystal display panel 200 are formed, but the film to be formed is not limited to a filter film. The film to be formed may be a pixel electrode film, an alignment film, or an opposing electrode film of a droplet discharge device, or may be an overcoat film or the like provided for the purpose of protecting a color filter or the like.

The device having film to be formed or the device that requires a film to be formed in a formation process is not limited to a droplet discharge device. Any device is possible as long as the device is one having a film such as that described above, or is one that requires film such as that described above to be formed in a formation process. For example, application can also be made to an organic EL display device. The functional film to be formed using the droplet discharge device described above in the case that an organic EL display device is to be manufactured may be a positive electrode film or a negative electrode film of an organic EL display device, a film for forming a pattern by photo-etching or the like, or a photoresist film for photo-etching or the like.

MODIFIED EXAMPLE 10

In the embodiments described above, the liquid crystal display panel 200 provided with a color filter, which is an example of an electro-optical device, was described as an example of a drawing target in which drawing is carried out by depositing functional liquid using the droplet discharge device 1. However, the drawing target is not limited to an electro-optical device. The liquid discharge device and liquid discharge method described above can be used as a manufacturing device and manufacturing method for working various target work objects using a work process in which various liquids are deposited during manufacture. For example, application can also be made to methods or devices for producing an electroconductive wiring film in which a liquid electroconductive material is discharged in order to manufacture a wiring substrate having wiring composed of electroconductive material; to methods or devices for producing a semiconductor wafer or a semiconductor device in which a liquid electroconductive material is discharged in order to manufacture an electroconductive wiring film of a semiconductor wafer or a semiconductor device; to methods or devices for producing a semiconductor wafer or a semiconductor device in which a liquid insulating material is discharged in order to form an insulating layer of a semiconductor wafer or a semiconductor device; and to other methods and devices.

MODIFIED EXAMPLE 11

In the embodiments described above, the droplet discharge device 1 deposits a functional liquid by moving the workpiece stage 23 on which the mother opposing substrate 201A or the like is disposed in the main scanning direction and discharging the functional liquid from the droplet discharge head 17. The droplet discharge head 17 (discharge nozzles 78) is positioned in relation to the mother opposing substrate 201A or the like by moving the head unit 21 in the sub scanning direction. However, it is not required that the relative movement in the main scanning direction of the mother substrate and the droplet discharge head as the deposition head be carried out by moving the mother substrate, and it is not required that the relative movement in the sub scanning direction be carried out by moving the discharge head.

The relative movement in the main scanning direction between the discharge head and the mother substrate may be carried out by moving the discharge head in the main scanning direction. The relative movement in the sub scanning direction between the discharge head and the mother substrate may be carried out by moving the mother substrate in the sub scanning direction. Alternatively, the relative movements in the main scanning direction and the sub scanning direction between the discharge head and the mother substrate may be carried out by moving the discharge head or the mother substrate in the main scanning direction and the sub scanning direction. Both the discharge head and the mother board may be moved in the main scanning direction and the sub scanning direction.

MODIFIED EXAMPLE 12

In the embodiments described above, the liquid crystal display panel 200 is an active matrix-type liquid crystal device that uses thin film transistors as drive elements, but the drive elements are not limited to TFT elements. The panel may be a liquid crystal device provided with other drive elements, e.g., a thin film diode (TFD). The alignment method of the liquid crystal device may be a vertical alignment or a horizontal alignment.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A liquid discharge method for depositing a liquid on a plurality of target discharge partitioned areas formed on a substrate as the liquid is selectively discharged from a plurality of discharge nozzles while the substrate and the discharge nozzles are moved relative to each other, the liquid discharge method comprising:

generating an arrangement map indicating selected positions of the target discharge partitioned areas in which the liquid is to be deposited, the selected positions being selected according to shapes and positions of the target discharge partitioned areas so that a number of the discharge nozzles selected to be used among the discharge nozzles capable of depositing the liquid in the target discharge partitioned areas is the same in each discharge timing.

2. The liquid discharge method according to claim 1, wherein
the generating of the arrangement map includes generating the arrangement map so that the number of the discharge nozzles selected to be used in each discharge timing to deposit the liquid in one of the target discharge partitioned areas is set to a predetermined number.

3. The liquid discharge method according to claim 1, wherein
the generating of the arrangement map includes generating the arrangement map so that a number of discharge cycles of each of the discharge nozzles selected to be used to deposit the liquid in one of the target discharge partitioned areas is the same.

4. The liquid discharge method according to claim 1, wherein
the generating of the arrangement map includes generating the arrangement map so that a discharge interval of each of the discharge nozzles selected to be used to deposit the liquid in one of the target discharge partitioned areas is equivalent to a minimum value of an interval of the discharge timing.

5. The liquid discharge method according to claim 1, wherein
the generating of the arrangement map includes generating the arrangement map so that a shape obtained by connecting an outermost periphery of landing positions of the liquid within one of the target discharge partitioned areas has a maximum surface area.

6. The liquid discharge method according to claim 1, wherein
the generating of the arrangement map includes generating the arrangement map so that a shape obtained by connecting an outermost periphery of landing positions of the liquid within one of the target discharge partitioned areas has a minimum surface area.

7. The liquid discharge method according to claim 1, wherein
the generating of the arrangement map includes generating the arrangement map so that a maximum number of the discharge nozzles is selected to be used to deposit the liquid within one of the target discharge partitioned areas.

8. The liquid discharge method according to claim 1, wherein
the generating of the arrangement map includes generating the arrangement map so that a minimum number of the discharge nozzles is selected to be used to deposit the liquid within one of the target discharge partitioned areas.

9. The liquid discharge method according to claim 7, wherein
the generating of the arrangement map includes generating the arrangement map so that the discharge nozzles arranged adjacent to each other are selected to deposit the liquid within the one of the target discharge partitioned areas.

10. The liquid discharge method according to claim 8, wherein
the generating of the arrangement map includes generating the arrangement map so that the discharge nozzles arranged adjacent to each other are selected to deposit the liquid within the one of the target discharge partitioned areas.

* * * * *